United States Patent
Singh et al.

(10) Patent No.: US 10,678,614 B2
(45) Date of Patent: Jun. 9, 2020

(54) MESSAGES WITH DELAYED DELIVERY IN AN IN-DATABASE SHARDED QUEUE

(71) Applicant: Oracle International Corporation, Redwood Shores, CA (US)

(72) Inventors: Devendra Singh, Bangalore (IN); Mukesh Jaiswal, Bangalore (IN); Shubha Bose, Bangalore (IN); Abhilash Tomar, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 179 days.

(21) Appl. No.: 15/827,839

(22) Filed: Nov. 30, 2017

(65) Prior Publication Data
US 2019/0163545 A1  May 30, 2019

(51) Int. Cl.
*G06F 9/54* (2006.01)
*G06F 12/0868* (2016.01)
*G06F 16/22* (2019.01)
*G06F 16/27* (2019.01)
*G06F 16/2455* (2019.01)

(52) U.S. Cl.
CPC .......... *G06F 9/546* (2013.01); *G06F 12/0868* (2013.01); *G06F 16/22* (2019.01); *G06F 16/2455* (2019.01); *G06F 16/278* (2019.01)

(58) Field of Classification Search
CPC ...... G06F 9/546; G06F 16/22; G06F 16/2455; G06F 16/278; G06F 12/0868
See application file for complete search history.

(56) References Cited

U.S. PATENT DOCUMENTS

| 8,037,024 | B1 | 10/2011 | Bozkaya |
| 8,046,780 | B1 * | 10/2011 | Alcock ............ G06F 9/52 709/226 |
| 8,489,820 | B1 | 7/2013 | Ellard |
| 8,959,067 | B1 | 2/2015 | Patiejunas |

(Continued)

OTHER PUBLICATIONS

U.S. Appl. No. 14/095,543, filed Dec. 3, 2013, Office Action, dated Jan. 4, 2016.

(Continued)

*Primary Examiner* — Doon Y Chow
*Assistant Examiner* — Kimberly L Jordan
(74) *Attorney, Agent, or Firm* — Hickman Palermo Becker Bingham LLP

(57) ABSTRACT

A DBMS maintains delayed and non-delayed messages within a non-delay shard and a delay shard that function as a pair. The DBMS stages non-delayed messages in enqueue-time order within the non-delay shard, and maintains a non-delay dequeue pointer that moves in physical order of the enqueued non-delay messages. The DBMS stages delayed messages in enqueue-time order within bucket shards of the delay shard. Each bucket shard, of a delay shard, represents a time span of delivery times, and messages are assigned thereto based on message delivery time. The delay dequeue pointer comprises a sub-routine to determine the message with the minimum delivery time within a current bucket shard with a time span that includes the current time. The DBMS delivers the next available message out of the delayed and non-delayed shards by comparing the delivery time of the next available message from each shard and delivering the earliest available message.

21 Claims, 12 Drawing Sheets

(56) References Cited

U.S. PATENT DOCUMENTS

| | | | |
|---|---|---|---|
| 2002/0099697 | A1 | 7/2002 | Jensen-Grey |
| 2002/0186656 | A1 | 12/2002 | Vu |
| 2006/0069605 | A1 | 3/2006 | Hatoun |
| 2006/0218560 | A1 | 9/2006 | Dadiomov et al. |
| 2007/0101341 | A1 | 5/2007 | Dowing |
| 2009/0133023 | A1 | 5/2009 | Li |
| 2010/0198920 | A1 | 8/2010 | Wong |
| 2010/0281491 | A1 | 11/2010 | Surlaker |
| 2011/0099233 | A1 | 4/2011 | Calder |
| 2011/0202929 | A1 | 8/2011 | Schleimer |
| 2014/0040040 | A1 | 2/2014 | Townsend |
| 2014/0067940 | A1 | 3/2014 | Li |
| 2014/0372486 | A1 | 12/2014 | Bose et al. |
| 2014/0372489 | A1 | 12/2014 | Jaiswal et al. |
| 2014/0372702 | A1 | 12/2014 | Subramanyam et al. |
| 2015/0121048 | A1 | 4/2015 | Lukefahr et al. |
| 2015/0237157 | A1* | 8/2015 | Wang .................. G06F 16/278 714/4.11 |
| 2016/0142510 | A1 | 5/2016 | Westphal et al. |
| 2018/0060145 | A1 | 3/2018 | Jaiswal |

OTHER PUBLICATIONS

Bose, U.S. Appl. No. 14/095,543, filed Dec. 3, 2013, Notice of Allowance, dated Jun. 12, 2017.
Bose, U.S. Appl. No. 14/095,543, filed Dec. 3, 2013, Office Action, dated Nov. 22, 2016.
Jaiswal, U.S. Appl. No. 14/095,734, filed Dec. 3, 2013, Adviosry Action, dated Mar. 9, 2017.
Jaiswal, U.S. Appl. No. 14/095,734, filed Dec. 3, 2013, Final Office Action, dated Jan. 6, 2017.
Jaiswal, U.S. Appl. No. 14/095,734, filed Dec. 3, 2013, Interview Summary, dated Mar. 2, 2017.
Bose, U.S. Appl. No. 14/095,543, filed Dec. 3, 2013, Interview Summary, dated Feb. 27, 2017.
U.S. Appl. No. 14/095,543, filed Dec. 3, 2013, Final Office Action, dated Apr. 20, 2016.
U.S. Appl. No. 14/165,974, filed Jan. 28, 2014, Office Action, dated Jan. 15, 2016.
U.S. Appl. No. 14/095,543, filed Dec. 3, 2013, Office Action, dated Nov. 22, 2016.
U.S. Appl. No. 14/095,734, filed Dec. 3, 2013, Interview Summary, dated Apr. 19, 2016.
U.S. Appl. No. 14/095,734, filed Dec. 3, 2013, Office Action, dated Jul. 15, 2016.
U.S. Appl. No. 14/095,734, filed Dec. 3, 2013, Office Action, dated Oct. 21, 2015.
U.S. Appl. No. 14/0965,734, filed Dec. 3, 2013, Final Office Action, dated Mar. 4, 2016.
U.S. Appl. No. 14/165,974, filed Jan. 28, 2014, Notice of Allowance, dated Jul. 1, 2016.
Jaiswal, U.S. Appl. No. 14/095,734, filed Dec. 3, 2013, Notice of Allowance, dated May 26, 2017.
Vojin G. Oklobdzija, "Chapter 17.5—Limitations of Simple Prefetching and Caching Strategies", Digital Systems and Applications, dated Nov. 26, 2007, CRC Press, 1 page.
Sugumar et al., "Efficient Simulation of Caches Under Optimal Replacement with Applications to Miss Characterization", dated 1992, 22 pages.
Kejser, Thomas, "Table Pattern: Database Message Queues", dated May 25, 2012, 10 pages.
Belady, L.A., "A Study of Replacement Algorithms for a Virtrual-Storage Computer", IBM Systems Journal, vol. 5, No. 2, dated 1966, 24 pages.
Jaiswal, U.S. Appl. No. 15/254,278, filed Sep. 1, 2016, Notice of Allowance, dated Feb. 6, 2018.

* cited by examiner

302: STORE A PLURALITY OF MESSAGES WITHIN A SHARDED MESSAGE QUEUE MAINTAINED BY A DATABASE MANAGEMENT SYSTEM; WHEREIN THE SHARDED MESSAGE QUEUE COMPRISES A PLURALITY OF MESSAGE QUEUE SHARDS THAT INCLUDES A PARTICULAR PAIR OF MESSAGE QUEUE SHARDS; WHEREIN THE PARTICULAR PAIR OF MESSAGE QUEUE SHARDS COMPRISES (A) A NON-DELAY MESSAGE QUEUE SHARD, AND (B) A DELAY MESSAGE QUEUE SHARD

304: IDENTIFY A PAIR OF MESSAGES COMPRISING A PARTICULAR DELAYED MESSAGE AND A PARTICULAR NON-DELAYED MESSAGE COMPRISING: IDENTIFYING THE PARTICULAR DELAYED MESSAGE, FROM THE DELAY MESSAGE QUEUE SHARD, THAT IS THE EARLIEST MESSAGE FROM THE DELAY MESSAGE QUEUE SHARD THAT IS AVAILABLE FOR DELIVERY, AND IDENTIFYING THE PARTICULAR NON-DELAYED MESSAGE, FROM THE NON-DELAY MESSAGE QUEUE SHARD, THAT IS THE EARLIEST MESSAGE FROM THE NON-DELAY MESSAGE QUEUE SHARD THAT IS AVAILABLE FOR DELIVERY

306: MAKE THE PARTICULAR MESSAGE OF THE PAIR OF MESSAGES, WHICH HAS THE EARLIEST DELIVERY TIME OF THE PAIR OF MESSAGES, AVAILABLE FOR DEQUEUING

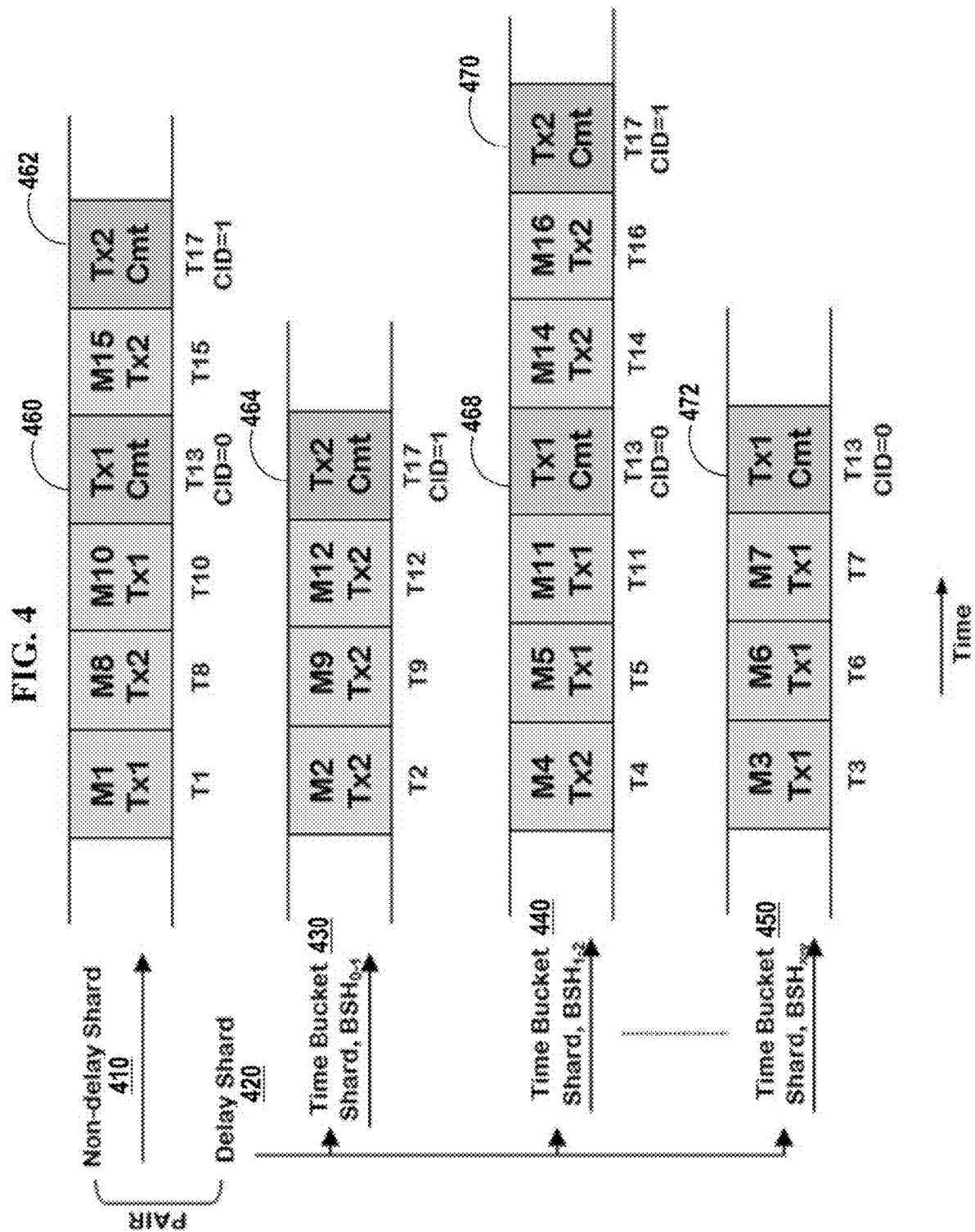

MESSAGES WITH DELAYED DELIVERY IN AN IN-DATABASE SHARDED QUEUE

CROSS-REFERENCES TO RELATED APPLICATIONS

This application is related to the following applications, the entire contents of each of which is incorporated by reference as if fully set forth herein:
  U.S. application Ser. No. 14/095,543, filed Dec. 3, 2013, titled "In-Database Sharded Queue";
  U.S. application Ser. No. 14/095,734, filed Dec. 3, 2013, titled "In-Database Sharded Queue For A Shared-Disk Database";
  U.S. application Ser. No. 14/165,974, filed Jan. 28, 2014, titled "Handling Memory Pressure In An In-Database Sharded Queue"; and
  U.S. application Ser. No. 15/254,278, filed Sep. 1, 2016, titled "Message Cache Management For Message Queues".

FIELD OF THE INVENTION

The present invention relates to implementation of delayed delivery of messages within sharded message queues, and more particularly, to maintaining correct interleaved ordering of delayed and non-delayed messages stored within shards of a sharded message queue.

BACKGROUND

In many applications, it is necessary for one process (computer program, module, or thread) executing on a computer system to communicate with one or more other processes executing on the same system or on other computer systems. One mechanism that facilitates process-to-process communication in a variety of systems is a "message queue". To use a message queue, processes ("enqueue sessions") send information to other processes ("dequeue sessions") by placing messages in a message queue. The dequeue sessions obtain the information from the enqueue sessions by reading the messages from the message queue. When all dequeue sessions that need to read a given message from the message queue have read the given message, the message is removed from the message queue.

Unfortunately, implementations of message queues may not scale well. Specifically, as the number of dequeue sessions increases, the contention for the "hot" messages at the head of the message queue increases, thereby degrading performance. In addition, when the enqueue sessions and dequeue sessions are spread across several systems, the amount of communication on the interconnect between the systems can become excessive.

A database management system (DBMS) may implement sharded message queues as a way to allow scaling of messaging throughput within the system by horizontally partitioning queue stores across multiple logical message queue entities called "shards". A DBMS may maintain dozens or hundreds of sharded message queues created by users of the database. A sharded message queue may have only one subscriber (e.g., a Java Message Service ("JMS") queue), or it may have multiple subscribers (e.g., a JMS topic). In the latter case, the subscribers are independent and may dequeue messages at different positions in the sharded queue.

Generally, message queues are implemented as first-in first-out queues. However, a client may require asynchronous processing of messages, i.e., particular messages are to be made available for dequeue at particular user-indicated times in the future. For example, JMS 2.0 provides a "message visibility time" property for a given message, which allows the provider to make a message visible at a certain pre-specified time. Clients can specify this time using the JMS header property "JMSDeliveryTime". JMS 2.0 also introduces a new message property called "delay". This property limits the visibility of a given message until the delay time indicated by the property has elapsed.

JMS is an application programming interface (API) for sending messages between clients. JMS is a messaging standard that allows applications to create, send, receive, and read messages. Embodiments are described in the context of JMS, however embodiments may be implemented using any messaging mechanism, and are not limited to JMS.

In a system that is able to process delayed messages within message queues, the delivery time of each message in a queue is either explicitly indicated (e.g., via a "message visibility time" property value), or is determined based on the enqueue time of the message plus any indicated delay time for the message (e.g., via a "delay" property value). For non-delayed messages, the "delay" property or "message visibility time" property value for the message is generally null (or "0" as appropriate) and, as such, the delay time for the message is 0. Delayed messages are inserted into the message queue at the time of receipt (i.e., enqueue time), but are not immediately available for dequeue.

In some cases, systems avoid making delayed messages available for dequeue before the delivery time of the messages by placing delayed messages into a temporary staging area rather than into the message queue from which messages are being actively consumed. Such systems publish delayed messages (i.e., make them available for dequeue) by moving delayed messages from the temporary staging area into the message queue at the respective delivery times of the delayed messages, which makes the messages available for dequeue at approximately the delivery time of the message.

However, since delayed messages must be placed in the temporary staging area and then moved according to this technique, publishing a delayed message in this way is costly because it involves at least two insert operations and one delete operation over the database tables implementing the message queue. Furthermore, resources (such as a background timekeeper process) must be dedicated to perform the needed movement of delayed messages from the temporary staging area to the message queue at the correct time. There is some latency involved in moving the messages to the message queue, which generally causes delayed messages to be available at somewhat later times than their assigned delivery times indicate.

In other cases, systems avoid making delayed messages available for dequeue before the delivery time of the messages by putting all messages into the message queue, but maintaining delayed messages as invisible (i.e., based on a message state) until the message is eligible for consumption. Once a delayed message is eligible for consumption, the system marks the message as visible, which allows the message to be consumed by subscribers.

However, such techniques require updating the properties of delayed messages, to change the message state, at the respective delivery times of the messages in order to make the messages visible within the message queue. Again, this technique requires resources that are dedicated to performing the needed property updates for delayed messages at the respective delivery times. Furthermore, changing the visibility property of delayed messages introduces latency into the system such that delayed messages are generally made available at somewhat different times than their respective delivery times indicate.

Furthermore, such techniques generally store messages (both delayed and non-delayed) in the order in which the messages were received. Thus, delayed messages (interleaved with non-delayed messages) are delivered at later times than their neighboring non-delayed messages. This storage system significantly delays bulk deletion of messages since some of the messages in a given block are eligible for dequeue only after a delay. For example, messages in an example message queue are stored in a partitioned table having N partitions. When all of the messages in a given partition have been delivered to all subscribers, the partition is eligible for bulk deletion (such as using a truncate table operation). In a message queue with only non-delayed messages, such bulk deletion is an effective way to free up database space since the partitions empty out basically in order. However, if delayed messages are interspersed throughout all partitions in the table, bulk deletion of a given table partition is delayed until the delivery time of all of the delayed messages stored in the partition have passed and those messages have been delivered to all required subscribers.

It would be beneficial to allow delayed consumption of messages from a sharded message queue without requiring resources (such as a background timekeeper process) that are dedicated to detecting the time at which delayed messages should be made available. Also, it would be beneficial to make delayed messages available more precisely at the indicated delivery times of the messages. Furthermore, it would be beneficial to allow for efficient bulk deletion of both delayed and non-delayed messages from database storage.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3 depicts a flowchart for utilizing a pair of message queue shards to make delayed messages and non-delayed messages available for dequeue in a correct interleaved order.

FIG. 4 depicts a pair of delay/non-delay shards into which a particular enqueue session enqueues particular messages.

DETAILED DESCRIPTION

Figure 1:
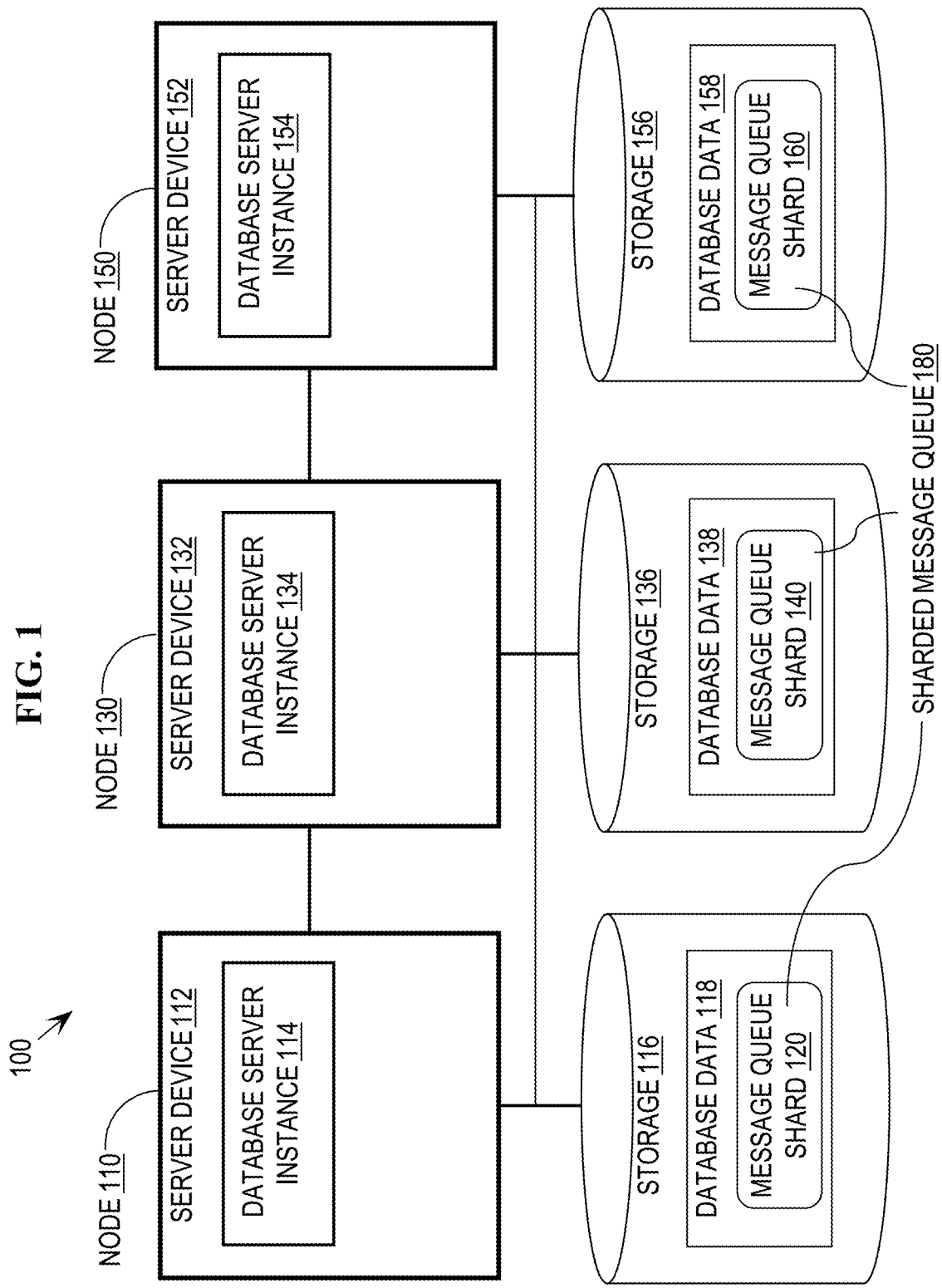
FIG. 1 is a block diagram that depicts an example arrangement of a database management system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

According to one or more embodiments, a DBMS maintains delayed and non-delayed messages within a pair of shards that function as a single shard of a sharded message queue. Specifically, the DBMS stages non-delayed messages in enqueue time order within a non-delay message queue shard (or "non-delay shard") of the pair of shards. The DBMS maintains a non-delay dequeue pointer that tracks the next available message in the non-delay shard by moving in physical order from earliest enqueued messages to later enqueued messages.

The DBMS also stages delayed messages in enqueue time order within various time bucket child shards of a delay message queue shard (or "delay shard") of the pair of shards. Each time bucket child shard, of a given delay shard, represents a specific time span of delivery times. Delayed messages are assigned to a given time bucket child shard (or "bucket shard"), of the delay shard, based on the delivery time of the delayed message. As indicated, the messages within a given bucket shard are ordered by enqueue time to facilitate efficiency in enqueuing the messages. The DBMS virtually orders, by delivery time, the delayed messages within the delay shard using a sub-routine that determines the message with the minimum delivery time within a current bucket shard, which represents a time span that includes the current system time.

According to one or more embodiments, in order to dequeue the messages in correct order, the DBMS virtually merges the sub-streams of messages within the pair of shards to create a single delivery stream that is ordered by delivery time. To merge the sub-streams, the DBMS delivers the next available message out of the delayed and non-delayed sub-streams by comparing the delivery time of the message that has the earliest delivery time (i.e., the "next available message") from both sub-streams and delivering the message that is available the earliest of the two messages.

Each bucket shard, of a given delay shard, is stored in a distinct table partition. Such arrangement of delayed messages allows bulk deletion of disk partitions. Specifically, once the time range of a given bucket shard has passed and all of the subscribers have dequeued the messages stored in the bucket shard, the disk partition allocated for the bucket shard may be deleted in bulk. Since the messages are grouped in the bucket shards based on delivery time, the bucket shards are emptied of delayed messages systematically as time passes.

In this way, embodiments avoid the issues and resource requirements of requiring background processes to identify when the time has come to deliver a delayed message. Also, since background processes and message relocation are not involved in embodiments, the precision of making delayed messages available for dequeue at their designated delivery times is increased (since background processing and message relocation generally introduce latency into the message delivery system). Further, embodiments avoid the need to move or update properties of delayed messages after enqueue, i.e., at delivery time. In this way, message identifiers that are based on the location of the identified messages need not be updated in consequence of the message being moved to another location for delivery.

Also, because the delayed and non-delayed messages are stored separately, and not interspersed in storage, bulk deletion of table partitions storing both delayed and non-delayed messages is enabled since delayed messages do not block the deletion of messages that are to be delivered at an earlier time. Furthermore, since embodiments function within a sharded message queue, all advantages of scalability and performance inherent to a sharded message queue are applicable to embodiments. For example, staging messages in a sharded queue allows for elimination of costly in-memory or disk ordering structure.

Message Queue Shard Pair

A database management system (DBMS) 100, implemented by database server instances 114, 134, and 154 depicted in FIG. 1 (as described in further detail below), maintains a sharded message queue 180 comprising multiple message queue shards 120, 140, and 160. In the illustrated embodiment, the shards that belong to sharded message queue 180 are maintained separate from each other, and are managed by different database server instances. In the example illustrated in FIG. 1, shards 120, 140, and 160 are respectively maintained by distinct instances 114, 134, and 154. Shards 120, 140, and 160 are described herein as illustrative examples of shards of sharded message queue 180, and descriptions of shards 120, 140, and 160 are applicable to shards depicted in other figures other than FIG. 1. Further, while the illustrated embodiment shows one shard maintained by each database server instance, there is no limit to the number of shards, of a given sharded message queue, that any database server instance may maintain.

Figure 2:
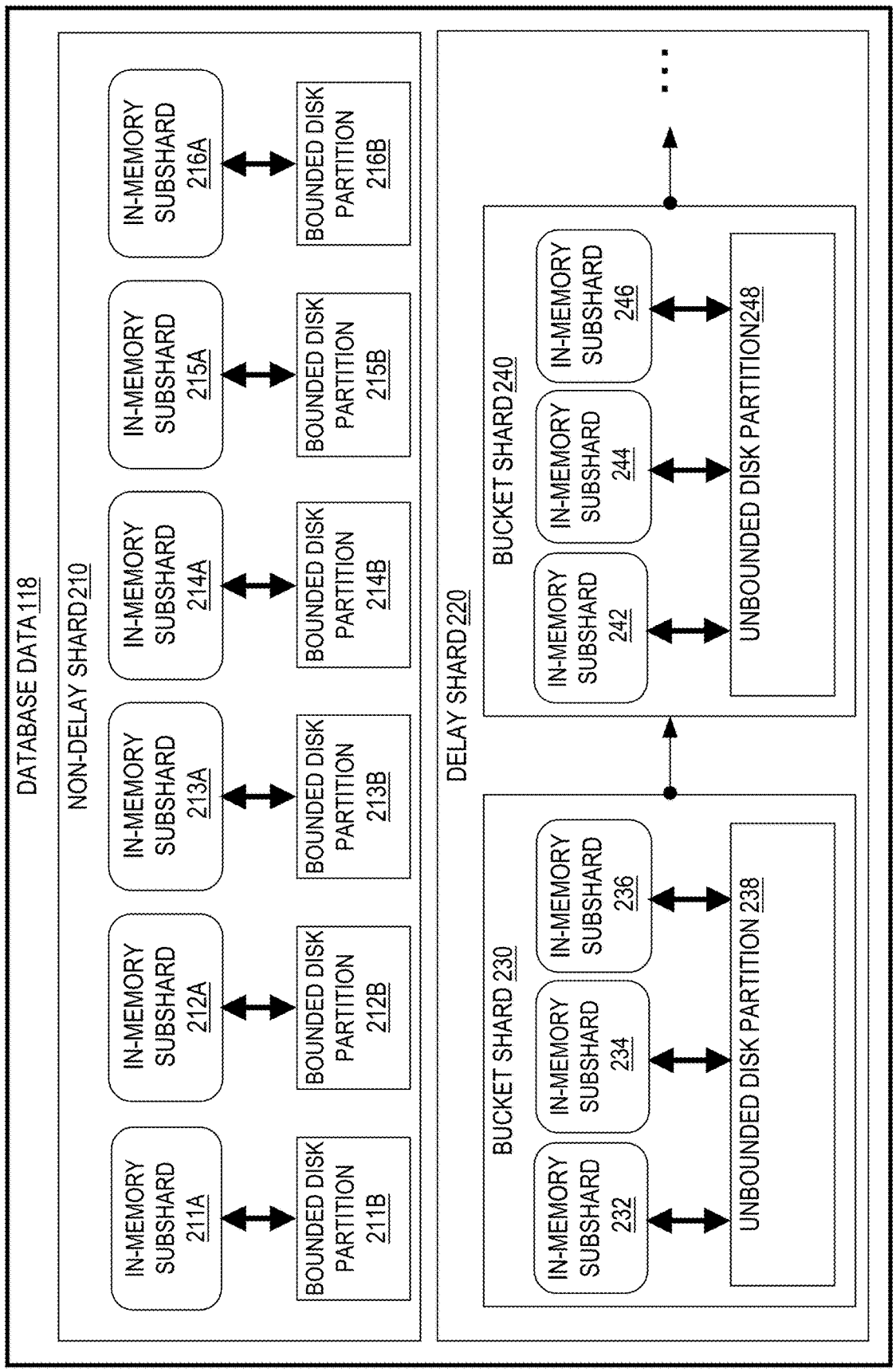
FIG. 2 depicts a pair of message queue shards that includes a non-delay message queue shard and a delay message queue shard.

As depicted in FIG. 2, database data 118 (which may or may not include data from a message cache) includes a non-delay message queue shard 210 and a delay message queue shard 220. Non-delay shard 210 and delay shard 220 constitute a pair of shards that function as a single message queue shard for purposes of sharded message queue 180 maintained by DBMS 100. As such, the pair of shards 210 and 220 coordinate resources in order to deliver the stored delayed and non-delayed messages in the correct interleaved order.

Storing Messages within the Shard Pair

FIG. 3 depicts a flowchart 300 for utilizing a pair of shards, such as shards 210 and 220, to make delayed messages and non-delayed messages available for dequeue in a correct interleaved order. At step 302, a plurality of messages are stored within a sharded message queue maintained by a database management system; wherein the sharded message queue comprises a plurality of message queue shards that includes a particular pair of message queue shards; and wherein the particular pair of message queue shards comprises (a) a non-delay message queue shard, and (b) a delay message queue shard. For example, database server instance 114 (depicted in FIG. 1) stores a plurality of messages within a sharded message queue 180 maintained by DBMS 100. Specifically, database server instance 114 stores the messages within non-delay shard 210 and delay shard 220 (maintained by database server instance 114, as depicted in FIG. 2), which are shards of sharded message queue 180.

More specifically, the plurality of messages stored within non-delay shard 210 and delay shard 220 comprises one or more delayed messages and one or more non-delayed messages. Database server instance 114 stores the one or more delayed messages in delay shard 220, and stores the one or more non-delayed messages in non-delay shard 210. Embodiments are described herein as utilizing the "delay" property to determine the delivery time of a message. However, according to one or more embodiments, the delivery time of a message is determined based on a message visibility time property value.

According to one or more embodiments, an enqueue session starts with database server instance 114 identifying a particular shard of sharded message queue 180 for enqueued messages for the session. For example, database server instance 114 maintains message queue shard pair 210/220 and, as such, the instance identifies shard pair 210/220 as the shard into which messages for the enqueue session are to be enqueued.

Enqueuing Messages in Non-Delay Shard

Non-delay shard 210 employs a typical construct for a message queue shard, as depicted in FIG. 2 and described in further detail below, and messages are enqueued and dequeued within non-delay shard 210 first-in-first-out (FIFO). For example, database server instance 114 receives a request through the example enqueue session to enqueue a particular message, and the delay property of the message is zero or null. As such, According to one or more embodiments, database server instance 114 stores this non-delayed message within non-delay shard 210 in order of enqueue time. Since non-delayed messages are delivered as soon as possible, ordering these messages by enqueue time also implicitly orders the messages by delivery time, i.e., FIFO.

Each subshard 211A-216A of non-delay shard 210 is stored within a bounded table partition 211B-216B, respectively, within a table implementing non-delay shard 210. As such, each subshard 211A-216A stores a set number of messages (e.g., 20,000 messages). Once the current subshard of non-delay shard 210, e.g., subshard 215A, is full of messages, database server instance 114 allocates a new bounded disk partition, e.g., partition 216B, for a new subshard 216A of non-delay shard 210. Additional messages enqueued in non-delay shard 210 are placed in new subshard 216A. The subshards 211A-216A of non-delay shard 210 empty in FIFO order and, as such, are made available for bulk deletion as the messages in the subshards are drained.

Delay Shard Structure

The ordering of messages within delay shard 220 is addressed by the inclusion, within delay shard 220, of a plurality of bucket shards. Each bucket shard in delay shard 220 corresponds to a distinct span of future time. According to one or more embodiments, the time spans of the bucket shards in delay shard 220 do not overlap. Each given bucket shard stores messages that have delivery times that fall within the time span that corresponds to the given bucket shard.

According to one or more embodiments, messages are staged within each bucket shard of delay shard 220 in message enqueue time order, which reduces the up-front processing required to enqueue the messages. The delivery time-based bucket shards of delay shard 220 allow the delayed messages to be ordered by delivery time to a certain degree. The time spans corresponding to bucket shards are configurable in width, and may be measured in any unit, such as hours or minutes or days.

Since the bucket shards within delay shard 220 implement the functionality of delay shard 220, they are considered components of delay shard 220. Each bucket shard is based on the typical construct of a message queue shard (as described in further detail below), and bucket shards 230 and 240 are the logical child shards of parent delay shard 220. The structure of a bucket shard is partitioned internally into subshards based on the number of messages stored in the shard, where new subshards are allocated when previously-created subshards are filled. For example, bucket shard 230 is partitioned into subshards 232, 234, and 236 and bucket shard 240 is partitioned into subshards 242, 244, and 246. Messages with delivery time lying in particular time bucket will be placed in subshards of the bucket shard in order of their enqueue time.

According to embodiments, the sub shards of a given bucket shard are all assigned to an unbounded disk partition, which is allocated for the entire bucket shard for disk storage of messages of the bucket shard. All subshards of a bucket shard are assigned to the same partition in order to facilitate searching the bucket shard for the next available message for dequeue, as described in further detail below. Also, the messages within a given bucket shard are ordered by enqueue time rather than by delivery time, and as such, subshards of the bucket shard do not drain serially as do subshards of a non-delay shard. As such, a bucket shard is subject to bulk deletion when the entire shard has drained of messages. A dequeue log partition mapped to a bucket partition is also unbounded. Hence, there is one queue partition and one dequeue log partition for a given bucket shard.

FIG. 2 depicts delay shard 220 as comprising at least bucket shard 230 and bucket shard 240, however delay shard 220 may include any number of bucket shards. Delay shard 220 is a parent shard to bucket shards 230 and 240, and delay shard 220 does not, itself, contain subshards or messages outside of the bucket shards. Database server instance 114 attaches, to delay shard 220, a list of bucket shard handles in order of bucket time span (i.e., the time spans corresponding to the respective bucket shards).

When database server instance 114 receives a message enqueue request for a delayed message that has a delivery time that falls outside of the time spans of all bucket shards of delay shard 220, database server instance 114 allocates a new unbounded disk partition within a table that implements delay shard 220 and provisions a new bucket shard within the new partition. Database server instance 114 assigns the new bucket shard a time span that includes the delivery time of the newly-received message and enqueues the message within the new bucket shard. When such a new bucket shard is created, database server instance 114 inserts a bucket shard handle for the new bucket shard into the ordered list of bucket shard handles, where the position of the bucket shard handle corresponds to the time span of the new bucket shard with respect to the other listed bucket shards.

Enqueuing Messages in the Delay Shard

Delayed messages have a delivery time in the future, where the delivery time is the enqueue time of the message plus the amount of delay indicated in the message metadata. Database server instance 114 stores delayed messages by identifying which bucket shard corresponds to a time span that includes the future delivery time of the message. Database server instance 114 stores the message, in enqueue-time order, within the identified bucket.

For example, bucket shard 230 corresponds to the time span 12:00-13:00 (using a 24-hour clock) of a particular day and bucket shard 240 corresponds to the time span 13:00-14:00 of the same day. Database server instance 114 receives an enqueue request from the example enqueue session to enqueue a first message. Database server instance 114 determines to enqueue the message within the shard pair 210 and 220.

Database server instance 114 further determines the enqueue timestamp of the particular message (e.g., 11:50) and determines whether the delay property of the message is non-zero. In this example, the delay property of the particular message indicates a delay of 1 hour. Thus, the delivery time of the message is enqueue time+delay, which, in this case, comes to a delivery time of 12:50 the same day.

Based on the delivery time of the particular message, database server instance 114 determines that the message is to be enqueued in bucket shard 230 since the time span corresponding to bucket shard 230 is 12:00-13:00 and the delivery time of the particular message falls within that time span. Specifically, database server instance 114 searches the shard handle of delay shard 220, for the bucket shard handle that corresponds to the time span in which the delivery time of the message falls. Database server instance 114 performs a regular enqueue into the current subshard of bucket shard 230, which publishes the message in the bucket shard.

To expand on the previous example, database server instance 114 receives a request, from the example enqueue session, to enqueue a second message. Database server instance 114 determines that the second message has a delivery time of 13:55 of the particular day. In response, database server instance 114 stores the second message within bucket shard 240, which corresponds to the time span 13:00-14:00 of the particular day.

Message Dequeue

Returning to flowchart 300, steps 304 and 306 represent steps for making a particular message, from the particular pair of message queue shards, available for dequeuing. Specifically, at step 304, a pair of messages comprising a particular delayed message and a particular non-delayed message are identified, wherein identifying the pair of messages comprises: identifying the particular delayed message, from the delay message queue shard, that is the earliest message from the delay message queue shard that is available for delivery, and identifying the particular non-delayed message, from the non-delay message queue shard, that is the earliest message from the non-delay message queue shard that is available for delivery.

Specifically, according to one or more embodiments, in order to dequeue a message from the pair of shards 210 and 220, database server instance 114 first identifies (a) the next available (undequeued) message within non-delay shard 210 and (b) the next available (undequeued) message within delay shard 220. Database server instance 114 identifies which of the pair of next available messages has the earliest delivery time and makes that message available to be dequeued. Each of the shard pair 210 and 220 maintains a pointer to the next available message in the respective shard, as described in further detail below.

Identifying the Next Available Message in the Non-Delay Shard

For example, the messages stored within non-delay shard 210 are stored in enqueue time order, which is also delivery time order for these non-delay messages. The pointer to the next available message in non-delay shard 210 is simply the pointer to the oldest message in the queue maintained within non-delay shard 210 (which functions as a first in first out (FIFO) queue). Thus, database server instance 114 identifies the next available (undequeued) message within non-delay shard 210 based on which message is the oldest in the queue.

Identifying the Next Available Message in the Delay Shard

Since messages in delay shard 220 are staged within bucket shards in enqueue time order and not in delivery time order, the next available deliverable message within delay shard 220 is re-computed after every dequeue by a subroutine that identifies an identifier of the next available message in delay shard 220. This identifier of the next available message in delay shard 220 acts as a virtual pointer to the next available message in delay shard 220. Since the virtual pointer for the delay shard is recomputed as needed, the system may act as if delay shard 220 were ordered by delivery time in the same way that non-delay shard 210 is physically ordered by delivery time. A "deliverable" delayed message is a message whose delivery time has at least been reached.

According to one or more embodiments, if the delivery time of the message with the earliest delivery time within delay shard 220 has not yet been reached, then the virtual pointer to the next available message within delay shard 220 is a null pointer, or does not indicate any message identifier. In this way, database server instance 114 virtually orders the messages within delay shard 220 by delivery time since the virtual pointer points to the next available message in delay shard 220.

For example, database server instance 114 begins making messages from bucket shard 230 available when the time span of the bucket shard arrives. Thus, bucket shard 230 is the "current bucket shard" of delay shard 220. If bucket shard 230 resides in cache of server device 112 (FIG. 1), then to identify the next available message, database server instance 114 performs a full scan of bucket shard 230 ahead of a dequeue Low Water Mark (LWM) within the bucket shard (dequeue LWM of delay shard 220 is discussed in further detail below) to find the next available message within the bucket shard, i.e., by scanning all of subshards 232, 234, and 236. Since the bucket shard resides in cache, the full scan of the bucket shard is a relatively inexpensive in-memory scan. Furthermore, database server instance 114 need only scan a single unbounded disk partition for the bucket shard.

If the current bucket shard resides in cache and contains many messages, an in-memory index on the current bucket shard may be maintained to avoid a full in-memory scan of the current bucket shard. To illustrate, an in-memory index on current bucket shard 230 is created when database server instance 114 determines that generating an in-memory index on bucket shard 230 would be more efficient than performing a full scan of bucket shard 230 every time the next available message within current bucket shard 230 needs to be determined. For example, database server instance 114 automatically determines (or has access to data that indicates) a certain threshold number of messages within a current bucket shard. Based on determining that the current bucket shard stores more than the certain threshold number of messages, database server instance 114 determines that it is most efficient to generate an in-memory index over the current bucket shard.

However, if bucket shard 230 is uncached, a full bucket scan would be expensive since the scan would be over data stored on disk. In this case, database server instance 114 runs a database statement that utilizes an index over delivery time of the messages, rather than performing a full scan of the bucket shard. For example, database server instance 114 runs, over the unbounded disk partition 238 for bucket shard 230, a SQL statement with a min( ) function over a delivery time column (described in further detail below). Database server instance 114 utilizes a delivery_time index (that is an index over delivery_time column also described in further detail below) to speed up the database statement, i.e., by identifying the next delivery time located in the index.

According to one or more embodiments, database server instance 114 joins the current bucket partition of the search with the dequeue log corresponding to bucket shard 230, to exclude the already dequeued delayed messages from the results of future searches. Further, since the subshards are all stored in one unbounded disk partition, database server instance 114 can run the database statement over all subshards of a given bucket shard at once. If the subshards of a bucket shard were mapped to individual disk partitions, database server instance 114 would be required to combine the output of the multiple database statements, which would increase the expense of searching the bucket shard for the next available message.

Identifying a Particular Message for Dequeue

Again returning to flowchart 300, at step 306, a particular message of the pair of messages, which has the earliest delivery time of the pair of messages, is made available for dequeuing. For example, database server instance 114 makes the message with the earliest delivery time, from among the two messages identified as the next available messages from non-delay shard 210 and from delay shard 220, respectively, available for dequeue from the pair of shards 210 and 220.

If the next available message from non-delay shard 210 has an earlier delivery time than the next available message from delay shard 220, a regular non-delay dequeue is performed to dequeue the next available message from non-delay shard 210, and the dequeue pointer for non-delay shard 210 is advanced ahead of the chosen message.

However, if the next available message from delay shard 220 has an earlier delivery time than the next available message from non-delay shard 210, database server instance 114 performs a directed dequeue of the next available message in delay shard 220 using a "dequeue by message ID" mode of dequeue, where the message ID of the next available message is identified via the virtual pointer for the delay shard. After database server instance 114 makes the next available message from delay shard 220 available for dequeue, database server instance 114 recomputes the message identifier for the virtual pointer by identifying the next available message not yet made available for dequeue within delay shard 220.

In this way, by considering both the next available messages from non-delay shard 210 and from delay shard 220, database server instance 114 effectively merges the two ordered sub-streams of messages represented in non-delay shard 210 and delay shard 220.

Generally, subscribers dequeue messages from a sharded queue by, during a particular dequeue session, dequeuing a number of messages from each shard of the sharded queue, e.g., in round-robin fashion. Since the pair of shards 210 and 220 function as a single shard of sharded message queue 180, subscribers dequeue from the pair of shards 210 and 220 as if the pair was a single shard.

Deletion of Delivered Messages for Non-Delay Shards

Non-delay shard 210 has sequential staging of messages in delivery order, and thus database server instance 114 performs sequential advancement of the LWM behind which all message in non-delay shard 210 are dequeued and can be deleted. Since non-delay shard 210 is sub-partitioned by subshards (i.e., subshards 211A-216A), all of the subshards behind the dequeue LWM for non-delay shard 210 are available for bulk deletion. For example, database server instance 114 employs bulk deletion on subshards of non-delay shard 210 behind the dequeue LWM using truncate partition and/or bulk release of memory of subshard buffers that have been drained of messages.

Database server instance 114 advances the dequeue LWM in non-delay shard 210 during the commit of dequeues from non-delay shard 210. In other words, the dequeue LWM in non-delay shard 210 is left at/updated to the first undequeued message in the shard in staged enqueue time order. According to one or more embodiments, a dequeue LWM comprises a subshard identifier that is the first subshard in non-delay shard 210 that has undequeued messages, and all subshards/messages behind the subshard indicated by the dequeue LWM are already dequeued.

Database server instance 114 performs bulk deletion via truncation of subshards by truncating the bounded disk partitions corresponding to the subshards behind the LWM. For example, the dequeue LWM for non-delay shard 210 indicates the subshard identifier for subshard 212A, which indicates that all of the messages within subshard 211A have been dequeued. Database server instance 114 performs bulk deletion by truncating bounded disk partition 211B corresponding to subshard 211A, which frees bounded disk partition 211B.

Deletion of Delivered Messages for Delay Shards

Database server instance 114 maintains an ordered list of bucket shards within delay shard 220, ordered by recency of time span. Further, database server instance 114 only pulls messages from a single bucket shard of delay shard 220 at a time, since the time spans of the bucket shards do not overlap. As such, the virtual pointer to the next available message within delay shard 220 works through all of the messages stored within the current bucket shard before moving to a bucket shard that corresponds to the next earliest time span of the list of bucket shards.

Since each bucket shard is drained, in turn, during the time span to which the bucket shard corresponds, the LWM for deleted messages within delay shard 220 is interpreted as moving, sequentially, across bucket shards in delay shard 220. The LWM points to the subshard, within delay shard 220, from which a message has most recently been dequeued. As such, database server instance 114 efficiently deletes messages in bulk on a bucket shard basis by interpreting the LWM for delay shard 220 as pointing to the bucket shard containing the subshard that is indicated by the LWM. In this way, the delay shard staging design has a semblance with the non-delay shard staging design, with inherited benefits such as index-free ordering, quick reading in time order, bulk water mark based deletion, etc.

Extensions for a Multi-Node DBMS

As shown in FIG. 1, embodiments may be implemented on a DBMS that is implemented by multiple nodes (i.e., nodes 110, 130, and 150). Implementation of a sharded message queue 180 across multiple nodes introduces concepts of cross processing, as described in further detail below.

Because a sharded message queue is a single message queue implemented by multiple message queue shards, and a message may be published to the sharded message queue via any shard of the sharded message queue, subscribers must dequeue messages from all shards of the sharded message queue. The dequeuing process is most efficient when subscribers dequeue messages at all of the nodes having shards in which messages for the subscriber are enqueued. However, practically speaking, there are cases where a subscriber does not dequeue messages from all enqueuing database server instances, e.g., due to application design. A typical example is a JMS non-durable subscriber, which dequeues at a single instance or at less than all database server instances implementing the sharded message queue. Such subscribers require that messages enqueued in shards at other instances be dequeued at an instance where a dequeue session of the subscriber is present.

In order to accommodate such a requirement, embodiments allow messages to be cross forwarded from an enqueue instance to a required dequeue instance.

Control Metadata for Transactions Enqueuing Messages

An enqueuer can enqueue non-delay and delay messages in a single transaction. All of the messages of an enqueue session go in the same pair of non-delay shard and delay shard maintained by a given database server instance. Non-delay messages of that session go in the non-delay shard, e.g., non-delay shard 210 (FIG. 2). Delay messages of that session go in the paired delay shard, e.g., delay shard 220 (FIG. 2).

For full replay protocol, special transaction control metadata is inserted in the cache of message queue shards at the time of transaction activity, such as commit or rollback. Thus, when an enqueue transaction within a session enqueues messages within a pair of delay/non-delay shards, then the special control metadata is inserted in the message cache of each of the shards where messages are enqueued for the session. More information about full replay protocol is included below.

For example, FIG. 4 depicts a pair of delay/non-delay shards 410/420 into which a particular enqueue session enqueues particular messages. Specifically, the shard pair depicts a non-delay shard 410 and a delay shard 420, where delay shard 420 includes time bucket shards 430, 440, and 450. According to the depicted example, bucket shard 430 corresponds to hours 0-1, bucket shard 440 corresponds to hours 1-2, and bucket shard 450 corresponds to hours x-y where hours x-y occur after the time represented by hours 1-2. Such shards are implemented similarly to the delay/non-delay shard pair 210/220, and for purposes of this example are implemented by node 130 of FIG. 1.

An enqueue session at database server instance 134 enqueues messages M1, M3, M5, M6, M7, M10, and M11 at times T1, T3, T5, T6, T7, T10, and T11, respectively, as part of a first transaction Tx1. Similarly, another enqueue session at database server instance 134 enqueues messages M2, M4, M8, M9, M12, M14, M15, and M16 at times T2, T4, T8, T9, T12, T14, T15, and T16, respectively, as part of a second transaction Tx2.

When transaction Tx1 commits at time T13, database server instance 134 inserts special control metadata 460, 468, and 472, into message cache of the queue shards holding messages from transaction Tx1 (i.e., non-delay shard 410, bucket shard 440, and bucket shard 450). Since time bucket shard 430 does not include any messages from Tx1, database server instance 134 does not insert Tx1-specific special control data into that shard. Special control metadata 460, 468, and 472 signifies that transaction Tx1 has committed, i.e., for messages M1, M3, M5, M6, M7, M10, and M11. According to one or more embodiments, control metadata 460, 468, and 472 also includes identifiers of the messages enqueued by transaction Tx1. At time T13, transaction Tx2 has not yet committed. Thus, at time T13, only messages M1, M3, M5, M6, M7, M10, and M11 are available for dequeue (contingent on the delivery time of the respective messages).

Similarly, when transaction Tx2 commits at T17, database server instance 134 inserts special control metadata 462, 464, and 470 into message cache of the queue shards holding messages from transaction Tx2. Since time bucket shard 450 does not include any messages from Tx2, database server instance 134 does not insert Tx2-specific special control data into that shard. Special control metadata 462, 464, and 470 signifies that transaction Tx2 has committed. At time T17, all messages from M1 to M16 are available for dequeue (contingent on the delivery time of the respective messages).

According to one or more embodiments, transactions are assigned control identifiers ("CID") incrementally when the transactions respectively commit. The CID of a transaction indicates the order in which the transaction committed with respect to all other committed transactions, as with the example of FIG. 4.

Continuing with the example of FIG. 4, all of the instances of control metadata 460, 468, and 472 for transaction Tx1 are assigned the same unique CID, for example CID=0. Further, all of the instances of control metadata 462, 464, and 470 for transaction Tx2 are assigned CID=1, since transaction Tx2 commits after transaction Tx1.

Cross Forwarding and Full Replay Protocol

When messages from message cache of a shard are forwarded from an enqueue instance to a dequeue instance for one or more subscribers, data from a given pair of non-delay and delay shards is forwarded together. According to one or more embodiments, a cross master process, described in further detail below, forwards all of the shards within the pair.

For example, a database server instance implementing DBMS 100 initiates a cross master process in response to determining that a given subscriber only dequeues messages from less than all of the shards of sharded message queue 180. The cross master process forwards messages from the message cache of a given shard at an enqueue instance (such as database server instance 134) and a cross receiver receives the messages at the dequeue instance (such as database server instance 154) and stores the message within message cache of the corresponding shadow shard. The dequeue instance 154 populates message cache for a pair of shadow shards (i.e., non-delay shard 510 and delay shard 520 of FIG. 5), that correspond to the pair of shards (i.e., non-delay shard 410 and delay shard 420 of FIG. 4) on the enqueue instance 134 as described in further detail below, with the received messages. These shadow shards allow subscribers that do not dequeue from database server instance 134 but, instead, dequeue from database server instance 154 to have access to the messages maintained in shards of sharded message queue 180 by database server instance 134. In other words, the messages enqueued within shards maintained by database server instance 134 are made available, via cross processing, to dequeuing sessions at database server instance 154.

FIGS. 5A-5D depict a shadow shard pair 510 and 520 being maintained by database server instance 154 in connection with cross forwarding data from non-delay shard 410 and delay shard 420 maintained by database server instance 134. Such cross forwarding is performed, for example, in response to determining that a particular subscriber only retrieves messages from less than all shards of a sharded message queue. In the context of FIGS. 5A-5D, a subscriber retrieves messages from database server instance 154 and not from database server instance 134.

According to one or more embodiments, a first set of messages that reside in the plurality of message queue shards of a given pair of shards—before one of (a) the end of an ordered set of messages within a message queue shard, and (b) transaction control metadata within a message queue shard—are sent from a first database server instance to a second database server instance. For example, the plurality of message queue shards of example shard pair 410/420 of FIG. 4 comprise shards 410, 430, 440, and 450. Accordingly, database server instance 134 forwards all messages within the shard pair 410/420 that reside, for each message queue shard within shard pair 410/420, either (a) before the end of the ordered set of messages within the message queue shard or (b) before any transaction control metadata residing in the message queue shard. The ordered set of messages within a given message queue shard includes the messages, within all of the subshards of the given shard, in enqueue time order.

To illustrate, by time T12 prior to commit of either of Tx1 or Tx2, a cross process of database server instance 134 forwards, to a cross receiver of instance 154, messages M1 to M12 from non-delay shard 410 and delay shard 420. As shown in FIG. 4, messages M1 to M12 comprise all messages in the shards before transaction control metadata 460, 464, 468, and 472 in shards 410-450.

Figure 5A:
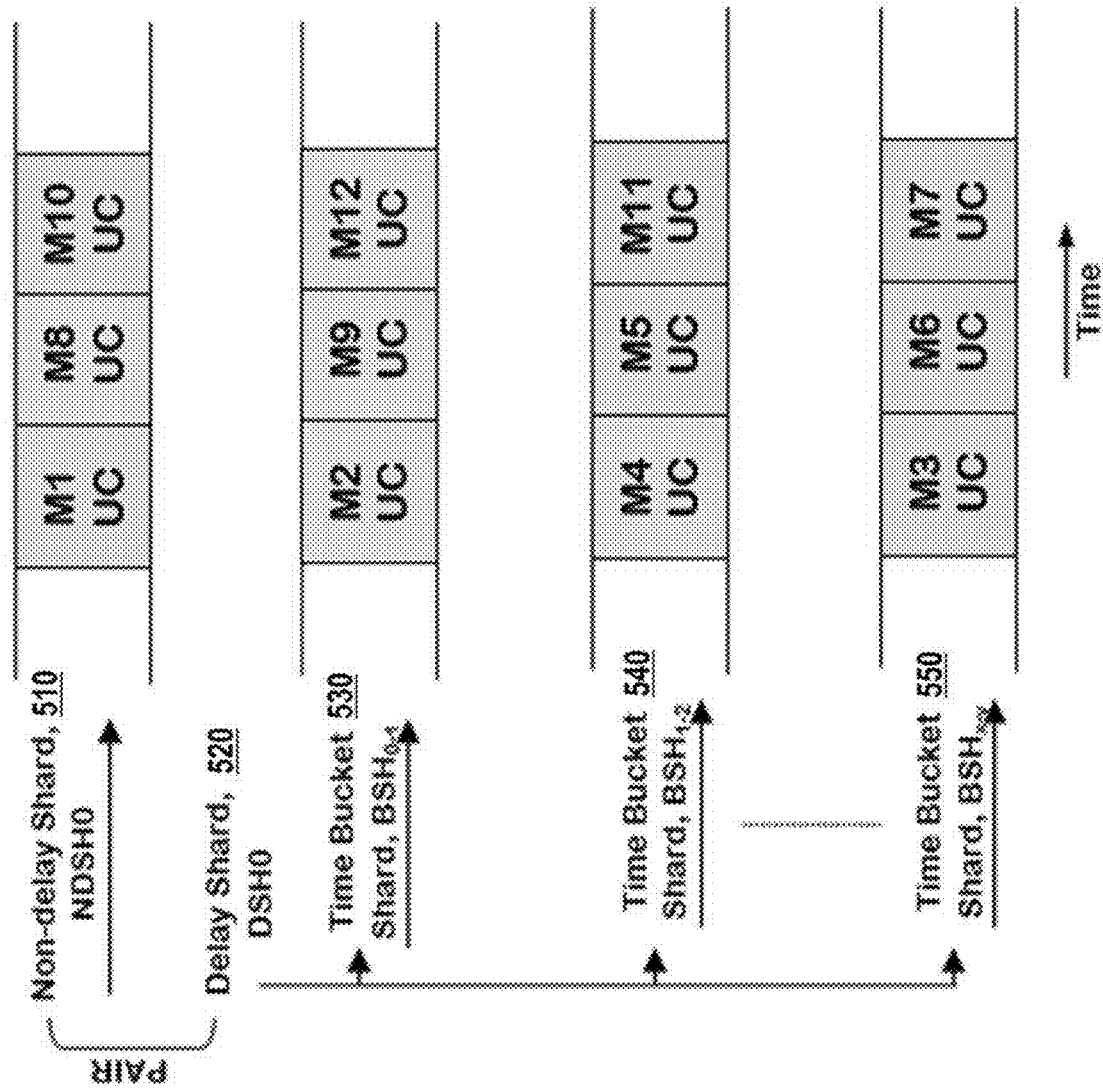
FIGS. 5A-5D depict shadow shards being maintained and updated by a database server instance.

According to one or more embodiments, in response to receiving the first set of messages from the first database server instance, the corresponding pair of shadow message queue shards are populated with the first set of messages. For example, as depicted in FIG. 5A, a cross receiver of database server instance 154 receives messages M1 through M12 and populates a shadow shard pair 510/520 with the messages. Shadow shard pair 510/520 correspond to source shard pair 410/420. Since database server instance 154 has not received any information about transactions committing, the message are stored within shadow shard pair 510/520 as uncommitted messages (as indicated by "UC" within the message depictions).

According to one or more embodiments, after sending the first set of messages, one or more transaction control metadata are identified as residing, within the plurality of message queue shards, after messages in the first set of messages. Continuing with the previous example, the cross master process at database server instance 134 reaches control metadata 460, 464, 468, and 472 within shards 410, 430, 440, and 450, respectively. Control metadata 460, 464, 468, and 472 refer to one of Tx1 (with CID=0) and Tx2 (with CID=1).

According to one or more embodiments, when two or more different transactions are represented in the identified transaction control metadata, it is determined that a particular transaction, of the two or more different transactions, has a lowest identifier value among the two or more different transactions. For example, database server instance 134 compares the control ids (CID) of all of the control metadata 460, 464, 468, and 472 and chooses the control metadata with the lowest CID to be sent to the dequeue instance 154 (which, based on how the CIDs are assigned, represents the transaction with the oldest commit among all transactions being compared).

In response to determining that transaction Tx1 has the lowest identifier value among the two or more different transactions identified in the control metadata, transaction control metadata that identifies the particular transaction is sent from the enqueue instance to the dequeue instance. For example, database server instance 134 sends control metadata 460, 468, and 472 associated with transaction Tx1 (i.e., with CID=0) to dequeue database server instance 154. According to one or more embodiments, the control metadata for a given transaction sent from database server instance 134 to database server instance 154 further includes message identifiers of messages published by the given transaction.

Figure 5B:
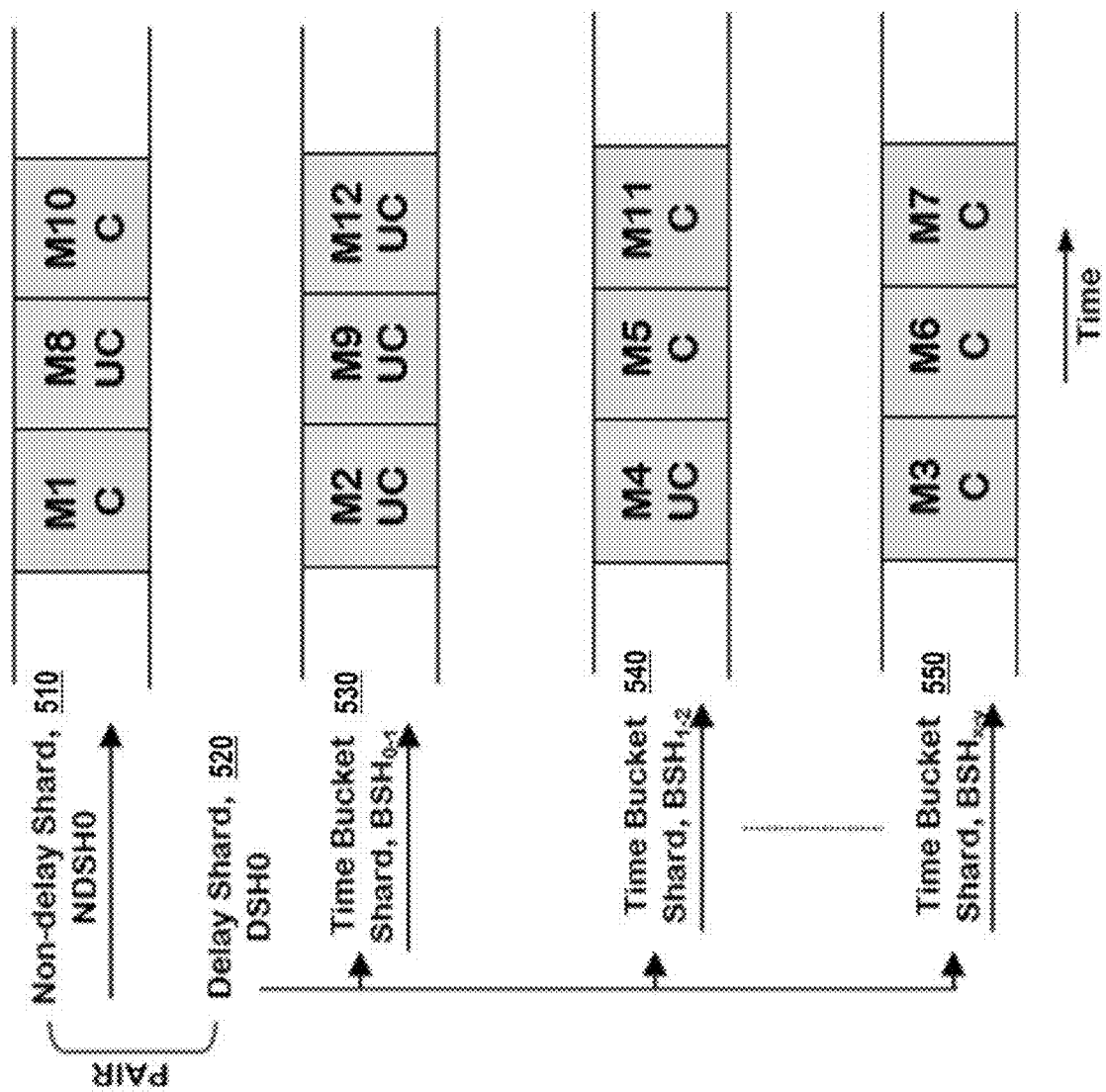

According to one or more embodiments, in response to receiving the particular transaction control metadata, dequeue instance 154 makes messages that correspond to the particular transaction available for dequeuing. For example, upon database server instance 154 receiving control metadata 460, 468, and 472 of transaction Tx1 (indicating commit of transaction Tx1), the cross receiver at database server instance 154 replays transaction Tx1 at database server instance 154 and marks all of the messages of Tx1 as committed, as depicted in FIG. 5B by messages M1, M3, M5, M6, M7, M10, and M11 being marked with a "C" for committed. The replay of all control metadata associated with a transaction is an atomic operation.

Since all of the control metadata for a given transaction is sent to the cross receiver together, the various control metadata inserted into the pair of shards 410/420 for a given transaction works as a single message that applies to all of the shards and child shards into which the transaction published messages. Further, since at the remote instance, the control metadata for a given transaction are all applied together, all control data for a given transaction is dealt with atomically at the dequeue instance.

The cross master process at database server instance 134 continues forwarding remaining messages within shard pair 410/420, forwarding each shard containing unsent messages until end of the shard's ordered set of messages or control metadata is reached. For example, bucket shard 450 has no unsent messages. Bucket shard 430 has no unsent message, but includes unsent metadata which is processed according to transaction metadata protocol. Non-delay shard 410 and bucket shard 440 include unsent messages that fall before any unsent control metadata. As such, database server instance 134 sends the unsent messages from non-delay shard 410 and bucket shard 440 to database server instance 154.

Figure 5C:
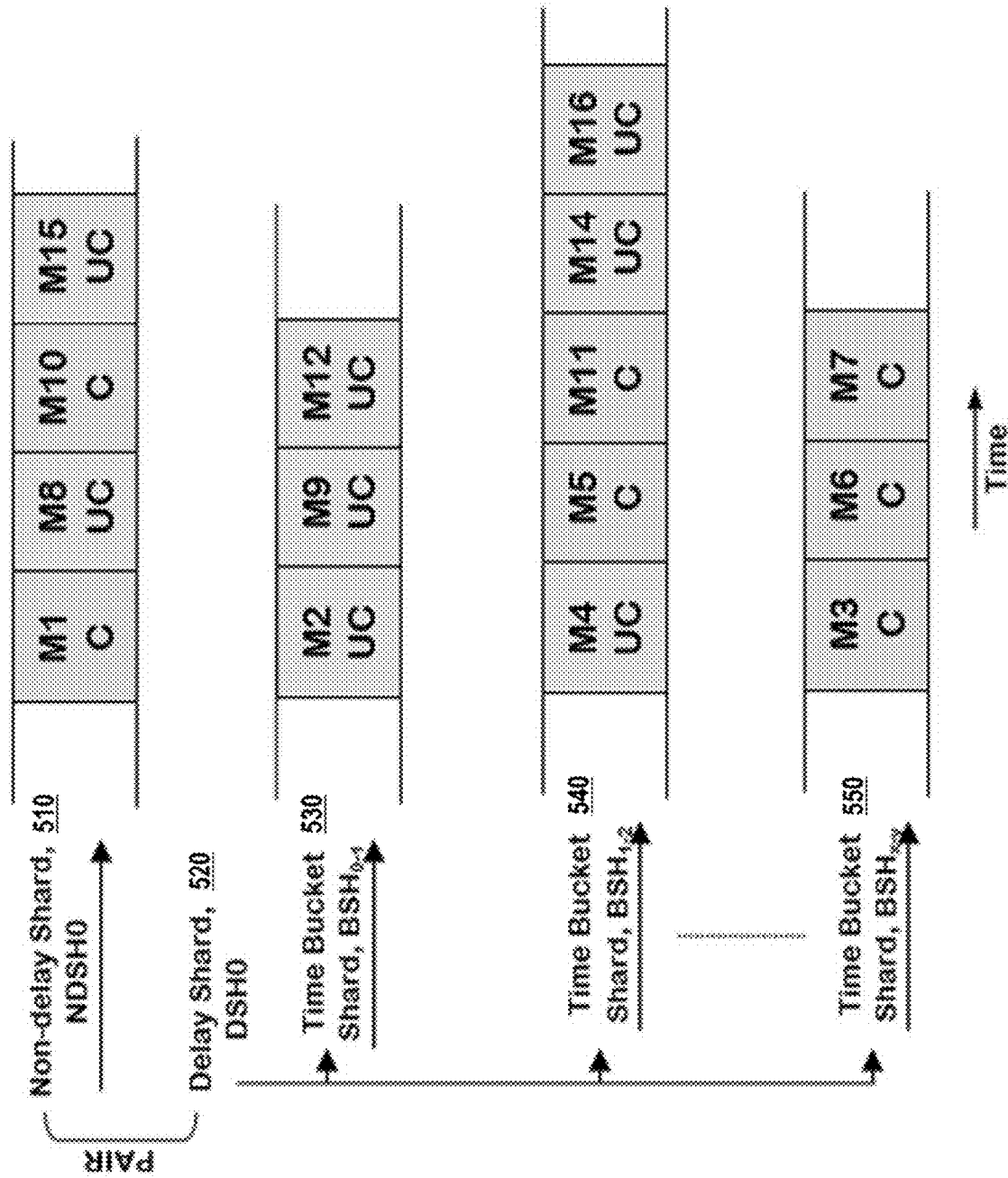

After receipt of these messages, database server instance 154 populates shadow shard pair 510/520 as depicted in FIG. 5C. Since the metadata for transaction Tx2 has not yet been processed at database server instance 154, all messages from Tx2 are still considered uncommitted, i.e., "UC".

At this point, database server instance 134 has reached control metadata to be sent in each of shards 410, 430, and 440. (Bucket shard 450 has no unsent messages and no unprocessed control metadata.) Database server instance 134 compares the control ids (CID) of all the control metadata reached in all of the shards and chooses the control metadata with the lowest CID to be sent. As such, database server instance 134 identifies the control metadata for transaction Tx2 (i.e., with CID=1) as the control metadata to be sent to database server instance 154 for processing within the shadow shard pair 510/520.

Figure 5D:
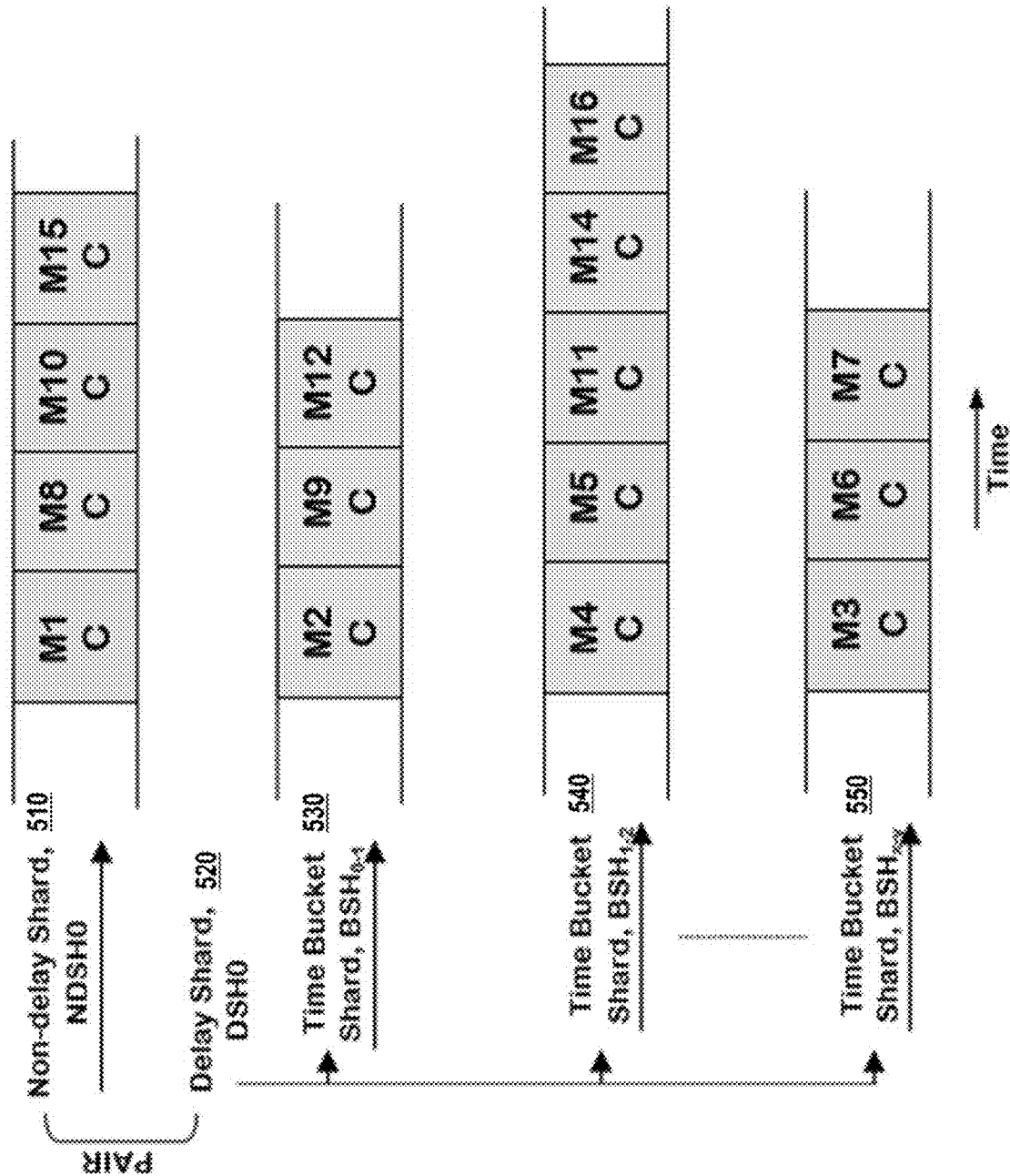

Based on identifying the control metadata for transaction Tx2 (i.e., with CID=1) as the control metadata to be sent to database server instance 154, database server instance 134 sends control metadata 462, 464, and 470 to database server instance 154. Upon receiving control metadata 462, 464, and 470, the cross receiver at database server instance 154 replays transaction Tx2 at database server instance 154 which causes the messages of transaction Tx2 to be marked as committed. FIG. 5D depicts the shadow shard pair 510/520 after database server instance 154 processes the control metadata for transaction Tx2.

In this way, all of the messages associated with a given transaction are received and marked as committed atomically in the same order on the shadow shards as on the primary shards. The above full replay protocol ensures session and delivery time ordering of messages in shadow shards.

Message Cache Reload on Instance Restart

According to one or more embodiments, control metadata is not persisted to disk. Thus, upon database startup, there is no control metadata within the messages of a given pair of shards to be loaded from disk. Nevertheless, the DBMS may require forwarding of the loaded messages to a shadow shard maintained by another database server instance as described in detail above.

When such forwarding is required, the DBMS inserts manufactured control metadata into the message queue shards. The manufactured control metadata identifies fixed batches of messages, within the pair of shards, as simulated transaction groups notwithstanding the original assignment of messages to the transactions that published them. This construct is viable because all messages that are loaded from disk during database startup have necessarily been committed. Each of these control metadata, when forwarded and received at the remote database server instance, causes the remote instance to commit the messages in the simulated transaction group indicated by the control metadata.

According to one or more embodiments, non-delayed and delayed messages with delivery times during the same time frame are grouped within the same simulated transaction group (i.e., with control metadata that has the same CID). In this way, messages with interleaved delivery times during the same time frame are committed, at the remote instance, at the same time, which maintains the correct interleaved order of non-delayed and delayed messages. Upon forwarding these messages to a dequeue instance, for the purpose of populating a shadow shard maintained by the dequeue instance as described in detail above, these simulated transaction groups are treated as if normal transactions, and will cause the delayed and non-delayed messages with delivery times within a given time frame to atomically be made available for dequeue. In this way, the correct order of the messages within a given time frame is preserved at the dequeue instance.

Furthermore, within message cache, an optimizer of a database server instance that loads messages into the cache based on imminent need of the messages has information about exactly when messages within a delay shard are needed, i.e., based on the time spans associated with the child bucket shards of the delay shard. Thus, the optimizer can base loading delayed messages into the cache on the delivery times as organized according to the child bucket shards.

Delivery_Time Column and Index

A database management system, such as DBMS 100 implemented by the one or more database server instances depicted in FIG. 1, stores message queue shards within one or more sharded queue tables. According to one or more embodiments, the one or more sharded queue tables use a column 'DELIVERY_TIME' to store delivery time property values for the messages stored in the table, where the delivery time of a message is the enqueue time of the message plus any applicable delay. According to one or more embodiments, the 'DELIVERY_TIME' column does not hold values for messages that are not delayed.

According to one or more embodiments, database server instance 114 maintains a local partition index, for each bucket shard individually, on the 'DELIVERY_TIME' column of the sharded queue tables storing data for delay shard 220. These local partition indexes facilitate the search for the next available message within delay shard 220, since messages within each bucket shard of delay shard 220 must be delivered in an order based on the 'DELIVERY_TIME' column values as described in detail above.

Subshards

Each sharded queue is implemented with a system-partitioned queue table for storing persistent messages and a system-partitioned log table that tracks the dequeue status of each message. Each sharded queue consists of a number of independent queue shards. Each queue shard is a sequence of independent subshards (i.e., table partitions with local indexes). According to one or more embodiments, a full subshard contains a certain amount of data comprising tens of thousands of messages, or contains a certain number of messages (e.g., 20,000 messages). At any point in time, each subshard with messages is in one queue shard.

According to one or more embodiments, to minimize pinging in a multi-node DBMS, all message enqueues on a queue shard are done on a single instance of the multi-node DBMS. In addition, all message dequeues on a queue shard by the same subscriber are done on a single instance of the multi-node DBMS. If the enqueue instance and a dequeue instance for a queue shard are not the same, there is a cross process that sends messages from the enqueuing instance to the dequeuing instance. In this way, a subscriber dequeues from all shards of a sharded message queue that contain messages for the subscriber.

Each shard may be divided into one or more ordered subshards. Within a subshard, messages are ordered by enqueue-time. In one embodiment, enqueue affinity is maintained such that an enqueuer always enqueues to the same shard of the sharded queue, such that a dequeue session can access the messages of each enqueuer in chronological order. In embodiments that shall be described in greater detail hereafter, a subshard may be implemented on disk within a queue table, and/or in memory within a message cache.

Since delayed messages are placed into bucket shards as they are received, and the bucket shard in which any given delayed message is placed is based on the delayed delivery time of the message, subshards within a bucket shard handle may have non-contiguous subshard identifiers.

Non-Delay Dequeue Pointers

According to one embodiment, each subscriber has a dequeue pointer for each shard of the sharded queue from which the subscriber is dequeuing messages. As mentioned above, the dequeue pointer for a subscriber, for a given shard, indicates the next message in the message cache available to dequeue. The dequeue pointer of a subscriber advances as the subscriber dequeues messages. If the transaction performing dequeue operations for a subscriber is rolled back, then the dequeue pointer for that subscriber moves backward to the position of the pointer at the time the transaction began. In addition, the dequeue pointer for a subscriber may move backward when a message, located at a position within the message queue shard that has already been passed by the dequeue pointer, is committed.

For example, three subscribers are dequeuing messages from subshard 211A of non-delay shard 210, which includes messages M6, M7, M8, M9, and M10 in that order of enqueue time. The dequeue pointer of each of the subscribers indicates the position, within subshard 211A, of the next message for the subscriber to dequeue.

Specifically, subscriber 1 has dequeued messages M6 to M9. Consequently, the dequeue pointer of subscriber 1 points to the message cache entry associated with message M10. Subscriber 2 has only dequeued messages M6 to M8. Consequently, the dequeue pointer of subscriber 2 points to the message cache entry associated with message M9. Subscriber 3 has only processed message M6. Consequently, the dequeue pointer of subscriber 3 points to the message cache entry associated with message M7.

The dequeue pointer contains two pieces of information that determine the visibility of messages in uncached subshards and the visibility of messages in cached subshards. These two pieces of information are discussed herein in turn.

The database maintains a logical timestamp of commit operations in the form of an SCN (System Change Number). The dequeue pointer contains an SCN so that dequeuers can use flashback query at this SCN to get a transactionally consistent view of uncached subshards. When a transaction that enqueues messages in sharded queues commits, the current SCN is stored within each dequeue pointer of these sharded queues. Dequeue sessions can also use the database current SCN to update the SCN in the dequeue pointer.

The dequeue pointer also stores an incarnation number that represents enqueue commit order for a shard. The incarnation number is an in-memory equivalent of the SCN and provides a transactionally consistent view of cached subshards. On enqueue commit, this incarnation number is updated and stored both within each cached message that is enqueued in the transaction and also in each corresponding dequeue pointer.

The SCN and incarnation number together provide a transactionally consistent view across both uncached subshards and cached subshards. These two pieces of information ensure session-level ordering of enqueued messages is observed by dequeuers that dequeue from uncached and cached subshards.

Commit Low Water Mark

According to one embodiment, every subscriber state contains a commit low watermark (LWM). The LWM of a subscriber represents a position within a shard below which none of the messages are of interest to the subscriber. This value is also durably stored to ensure it will not be lost in the case of a failure. In one embodiment, a LWM table is maintained on disk to track subshards that have been completely dequeued by the subscribers.

Every dequeue commit for a subscriber tries to move the watermark forward as much as possible. The commit function typically starts from the current watermark position (subshard-message) and moves it above all subsequent messages whose subscriber bit and lock bit for the particular position has value (0,1) respectively. The subscriber bit for a given messages indicates whether the message is successfully dequeued (0 for not successfully dequeued and 1 for successfully dequeued). The lock bit for a given message indicates whether the message is committed by the subscriber (0 for not committed and 1 for committed).

This movement stops on the message which does not have the above value. If, in this process, the commit watermark moves over a subshard (indicating that the subscriber has dequeued all messages in the subshard), then an indication that the subscriber has completed dequeuing the subshard is stored. When all subscribers to a shard have indicated that they have completed dequeuing a subshard, then (a) the one or more partitions associated with the subshard are truncated, and (b) the circular buffer used to cache messages for the subshard can be deallocated.

Because messages cannot be processed by subscribers before the transactions enqueuing the messages are committed, all messages that precede the commit low water mark will necessarily have been committed. Therefore, there will not be any in-flight enqueuing transaction or dequeuing transaction involving a message that precedes the commit low watermark.

The global LWM (Low Water Mark) is the minimum LWM value across all subscriber LWMs for a shard. Below a global LWM of all subscribers, no messages are of interest to any subscriber. Subshards below the global LWM can therefore be deleted, unmapped or otherwise removed at any time without affecting any subscriber.

Fully-Dequeued Table-Queue Partitions

After all subscribers of a sharded queue have processed the messages of a table queue partition that belongs to the sharded queue, the table queue partition is considered "fully-dequeued". Thus, all partitions that are below the current commit low watermark are fully-dequeued table-queue partitions. According to one embodiment, rather than delete individual messages after the messages have been consumed by all subscribers, messages are deleted in batches by truncating table queue partitions that have become fully-dequeued.

According to one embodiment, once truncated, the table queue partitions are returned to a "free pool" of table queue partitions that may be reused when room is needed for new messages that need to be enqueued in the sharded queue.

Dequeue Operations

In general, a dequeue session dequeues a persistent message by temporarily marking the message in the message cache as being dequeued, and by using SQL to update the appropriate row in a dequeue log partition. A post-commit callback updates the state of dequeued messages in the message cache.

According to one embodiment, the dequeue operations for a subscriber include:

Iterating over all messages from the dequeue pointer of the subscriber;
Determining whether the message satisfies the message selection conditions, if any, associated with the subscriber;
Determining whether each message has already been dequeued by the subscriber;
Sending to the subscriber each message that (a) satisfies the message selection conditions and (b) has not already been dequeued by the subscriber;
Temporarily marking each message in the message cache as being dequeued by the subscriber;
Updating the appropriate row in the appropriate dequeue log partition; and
Making a post-commit callback to update the state of the dequeued messages in the message cache.

Each message that is stored in sharded message queue 180 corresponds to the one row in a partitioned queue table, where each partition of the queue table corresponds to a particular subshard of a sharded queue. For example, a message M7 that is enqueued in subshard 211A of non-delay shard 210 is stored in a particular corresponding row of the queue table within a partition of the table storing data for subshard 211A.

When a subscriber successfully dequeues a persistent message, the subscriber updates its dequeue log to indicate that it has successfully dequeued the message. Specifically, the subscriber updates the row, within its dequeue log, that corresponds to the row, of the queue table, for the dequeued message. In addition, the subscriber temporarily marks the message in the message cache as being dequeued. In the present example, after dequeuing message M7, each subscriber updates a row of the subscriber's log table for subshard 211A, where the row of the log table corresponds to the row of the queue table for M7.

Shard Ownership for Enqueue Session on a Shared-Disk Database

According to one or more embodiments, in a shared-disk database, a shard is contained within a single instance. In this case, all sessions enqueuing on the shard and dequeuing from the shard are connected to the same instance. When more flexibility is needed for a given subscriber, the instance on which the dequeuing occurs for that subscriber can be different than the instance on which the enqueuing occurs. In this case a database background process (referred to herein as the "cross-process") sends messages from the message cache in the enqueuing instance to the message cache in the dequeuing instance. In a shared-disk database, a load balancer may make decisions on adding, removing, or changing cross processes. Embodiments of load balancers and cross processes are described in greater detail hereafter.

When one instance of the shared-disk database has the exclusive right to enqueue on a specific shard, it has enqueue ownership of the specific shard. Enqueue ownership of a shard is typically with the instance which created the shard. Enqueue ownership for shards ensures that no two enqueue sessions at different instances can enqueue in the same shard. In one embodiment, enqueue ownership of a shard assigned to a specific instance is always fixed and never changed until the specific instance is no longer alive. In case of death of an instance owning shards, enqueue ownership of such shards may be assigned to other alive instances, such as by load balancer.

Enqueue ownership information for all shards may be stored in a database dictionary table. For example, the enqueue ownership table may include the following columns:

QUEUE (specifies a sharded queue);
SHARD (specifies a shard of the specified sharded queue); and
ENQUEUE_INSTANCE (specifies an instance of a shared-disk database where the specified shard is created; the specified instance may have enqueue sessions to the specified shard).

Any enqueue session at the specified instance will perform enqueues in a shard associated with the enqueue instance. In one embodiment, the enqueue session continues to enqueue all its messages for a queue in the same shard in its lifetime, so as to preserve the order of messages enqueued by the session. The enqueue sessions of an instance may be distributed across the shards associated with the instance using a round-robin assignment scheme, a load-balancing assignment scheme or any other assignment scheme.

The enqueue ownership table may include additional columns, such as to facilitate the addition and removal instances, such as in an embodiment that shall be described in greater detail hereafter.

Shard Ownership for Dequeue Session on a Shared-Disk Database

For a specific shard and a specific subscriber, the instance of a shared-disk database that has the right to dequeue from the specific shard on behalf of the specific subscriber has "dequeue ownership" of the specific shard relative to the specific subscriber. For example, if instance X has dequeue ownership of shard Y relative to subscriber Z, then only instance X can dequeue messages from shard Y on behalf of subscriber Z.

Allowing only a single instance to dequeue from a given shard for a given subscriber ensures all data manipulation commands on the shard for dequeue purposes is done on a single instance for the given subscriber. Dequeue ownership may be enforced for a specific shard such that no two dequeue sessions at different instances can dequeue from the specific shard on behalf of the same subscriber. However, a subscriber can dequeue from two different instances from two different shards of the queue at the same time. For example, while instance X is dequeuing messages from shard Y for subscriber Z, another instance A can be dequeuing messages from another shard B for subscriber Z, conversely, instance A cannot dequeue messages from shard Y for subscriber Z however, instance A can dequeue messages from shard Y for another subscriber Q. Thus, a dequeue session can concurrently dequeue messages for a subscriber of a queue from different shards, where enqueue ownership of such shards is owned by dequeue instance or instances other than dequeue instance. Since there is one dequeue-log partition for each queue table partition, above preserves the order of messages enqueued by the session.

According to one embodiment, dequeue ownership of a shard for all subscribers of the queue remains with the enqueue instance of the shard. In one embodiment, this causes local dequeues (i.e. in memory from a message cache local to the instance), increasing performance and scalability by avoiding message copy across instance and reducing memory footprint. In another embodiment, dequeue ownership of some subscribers for a shard can be assigned to a non-enqueue owner instance to ensure effective draining of shards based on eagerness/capacity of dequeue session in certain instances. A load-balancer is typically responsible for deciding whether such a change in dequeue affinity can be done.

Dequeue ownership may be described using a tuple that identifies the following fields: Queue, Subscriber, Shard and Dequeue Instance. For the specified sharded queue, the specified subscriber can dequeue from the specified shard at the specified instance. In one embodiment, each subscriber has a dequeue session on each instance, the dequeue session of each specific instance dequeuing from one or more shards associated with that instance.

In one embodiment, there are cases where a subscriber does not dequeue messages from all shards and/or does not have a dequeue session on one or more instances, such as due to application design. For example, for a non-durable JMS subscriber, dequeues for a particular subscriber happen at a single instance or at less than all of the instances that are alive, and messages from shards at other instances are expected to be dequeued at the instance where subscriber's dequeue session is present.

Dequeue ownership of a shard for a subscriber is not fixed and can be changed to different instances to drain the shards across instances. For example, this allows non-durable JMS subscribers to the sharded queue. However, at any point of time, a subscriber can dequeue from a shard at any single instance. Therefore, enqueue ownership and dequeue ownership of a shard may be with different instances for a particular subscriber. In such cases of ownership mismatch, message forwarding mechanisms may be configured to detect the ownership mismatch and forward the messages for subscriber from the enqueuing instance to the dequeuing instance seamlessly, such as by one or more cross processes.

Load Balancer

In a shared-disk database, a load balancer may automatically perform load-balancing procedures. Load-balancing may be performed based on one or more factors, such as:
  Enqueue rate
  Dequeue rate
  Message backlog
  Available memory
  CPU usage
  Message throughput
  Message latency.

Furthermore, additional factors may be used in addition to these example factors. Different local and/or global policies may be implemented in a shared-disk database.

For example, consider a load-balancing policy that defines load as latency, where latency is amount of time a subscriber would take to dequeue all the messages at an instance based on factors such as past enqueue rate, past dequeue rate, current backlog, predicted enqueue rate, and predicted dequeue rate of that particular subscriber. In this case, "load" calculations are unique to a subscriber-instance pair. If enqueue rate is higher than dequeue rate of a subscriber at an instance, that instance is "loaded" for that subscriber. If dequeue rate of a subscriber is higher than or equal to enqueue rate at an instance, that instance is "not loaded" for that subscriber.

A load balancer may perform functions such as:
  Load calculation at all instances;
  Detection of need of message forwarding from an instance (loaded) to other instance (not loaded) when messages are not getting dequeued by subscriber(s) at all instances where enqueues are in progress;
  Choosing a shard from all available shards at loaded instance from which messages are forwarded to instance where load is less;
  Shifting dequeue ownership of a chosen shard from loaded instance to an instance with less load;
  Starting cross processes to forward messages to less loaded instances;
  Stopping cross processes to end forwarding messages to avoid overloading other instances and to reduce inter-instance communication; and
  Changing shard's ownership—e.g. in case of addition or removal of instances from the shared-disk database, shards owned by dead instances may be made available to alive instances for draining purposes.

These functions are example functions that may be performed by a load balancer; additional functions may be implemented by one or more load balancers in a shared-disk database system.

Load-balancing functionality may be performed locally and globally, such as by a local load balancer and a global load balancer. In one embodiment, load-balancing is implemented in one or more load-balancing layers.

Local Load Balancing

Local load balancing may be performed at each alive instance, and may include tasks such as:
  Based on load balancing policy in use, collecting required statistics to calculate "load" at that instance;
  Receiving and processing requests from a global load balancer to change dequeue ownership for a particular shard-subscriber pair;
  Ensuring that no uncommitted dequeue transaction is present for a shard-subscriber pair while changing dequeue ownership;
  Starting a cross process to forward messages to less loaded instances;
  Stopping a cross process to end forwarding messages, such as to avoid overloading other instances and to reduce inter-instance communication; and
  Owning shards whose OWNER_INSTANCE is no longer alive.

These tasks are examples of tasks that may be performed by a local load balancer or a local load balancing process; additional tasks may be implemented by one or more local load balancers in a shared-disk database system.

Global Load Balancing

Global load balancing is performed at only one instance amongst all live instances in a shared-disk database, and may include tasks such as:

Evaluating calculated "load" by local load balancers at all instances;

Deciding if dequeue ownership shift (message forwarding) is required for subscribers; and Sending requests to loaded instances to shift load to less loaded instances.

These tasks are examples of tasks that may be performed by a global load balancer or a global load balancing process; additional tasks may be implemented by one or more local load balancers in a shared-disk database system.

Shared-Disk Database Cross Processes

A cross process refers to a background process in a shared-disk database that sends message data from a shard's enqueue owner instance to one of the queue shard's dequeue owner instances. A cross process forwards messages from one instance to another instance so that the messages may be drained at a different instance. Message transfer results in a shard from enqueue owner instance being replicated at the dequeue owner instance. In one embodiment, cross processes are implemented as a layer adjacent to one or more load-balancing layers. A load balancer or a load-balancing process may trigger a cross process.

In one embodiment, a cross process involves the following components:

Source instance—An instance (enqueue ownership instance) from where messages are being forwarded;

Destination instance—An instance (dequeue ownership instance) where messages are being forwarded to;

Cross master—A background master process which runs at the source instance and forwards messages to the destination instance, and can handle multiple cross processes simultaneously;

Cross server—A background server process which runs at the destination instance and receives messages from the source instance; and Source and shadow shard—The shard which is being forwarded. At the source instance, it is called a source shard. At the destination instance, it is called a shadow shard.

A single cross process unit may be uniquely defined by specifying all of above components.

Messages associated with a shard can be forwarded to multiple instances at the same time to be dequeued by different subscribers. Furthermore, messages associated with the shard can be forwarded by different cross masters to different instances at the same time.

A cross master reads messages from the message cache at the source instance and forwards messages to the destination instance through the interconnect of the shared-disk database. A cross server receives these messages and populates them in the message cache at the destination instance. In one embodiment, only one cross master can forward messages associated with a shard from a source instance to a particular destination instance at any point of time. A cross process may be used by any number of subscribers to access messages when the same combination of shard, source instance and destination instance is involved.

Shadow Shard

A shard may be forwarded from a source instance to a destination instance. The term "shadow shard" shard refers to a forwarded shard at the destination instance. A shadow shard is created and populated at a non enqueue owner instance of the source shard for remote subscribers at the non enqueue owner instance to dequeue from. Shadow shards may be created and populated by a cross process by forwarding data over the interconnect of a shared-disk database. On a shared-disk database where forwarding is enabled, the instance with dequeue affinity and enqueue affinity might be different. In such a case, the message data on a first instance with enqueue affinity to a shard is replicated to the message cache of a second instance with dequeue affinity for that shard. The replicate shard is called a shadow shard. Shadow shards do not need queue table partition associations as no enqueue will be done, only dequeues will be performed. Shadow shards are thus only associated with dequeue log partitions.

Figure 6:
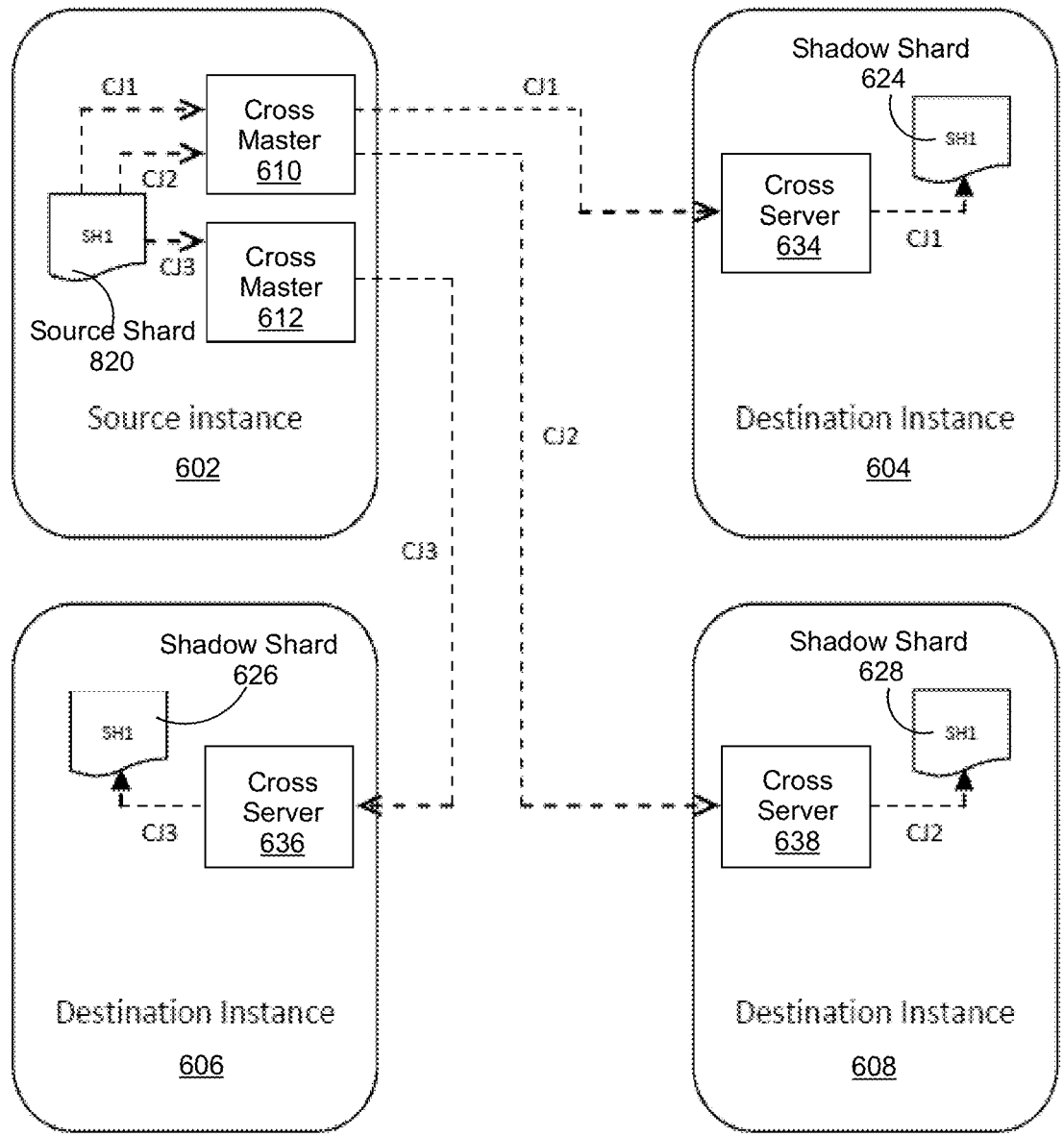
FIG. 6 is a block diagram illustrating an embodiment of cross processing with respect to a source instance and destination instances.

FIG. 6 is a block diagram illustrating an embodiment of cross processing with respect to a source instance and destination instances. Cross jobs CJ1, CJ2, CJ3 forward source shard 620 (SH1) from source instance 602 to shadow shards 624-628 of destination instances 604-608 for different subscribers. A cross master 610-612 reads messages from the message cache at the source instance 602 and forwards messages to the destination instance 604-608 through the interconnect. A cross server 634-638 receives these messages and populates them in the message cache at the destination instance 604-608.

For example:

cross job CJ1 forwards SH1 from source instance 602 to destination instance 604 via cross master 610;

cross job CJ2 forwards SH1 from source instance 602 to destination instance 608 via cross master 610; and cross job CJ3 forwards SH1 from source instance 602 to destination instance 606 via cross master 612.

As shown, a cross master, such as cross master 610, can handle multiple cross jobs simultaneously. A shard SH1 can also be forwarded to multiple destination instances 604-608 at the same time to be dequeued by different subscribers. Additionally, a shard can be forwarded by different cross masters 610-612 to different destination instances 604-608 at the same time. In one embodiment, only one cross master can forward a shard from a source instance to a particular destination instance at any specific point of time. A cross job could be used by any number of subscribers to forward messages for the same combination of shard, source instance and destination instance.

Cross Process Control Messages

When messages are dequeued from shadow shards at a destination instance, the ordering of messages enqueued by each enqueue session must be maintained. In one embodiment, cross process control messages containing special control metadata are inserted in the source shard's message cache at the time of transaction activity like commit or rollback. Control messages contain transactional details of ongoing enqueues in the subshard. The remote instance can determine the state of each message in the subshard using the control messages.

Using cross process control messages, a full replay protocol may be implemented. All transactional activity which happened in the source shard at the source instance is replayed in the shadow shard at the destination instance in exactly same order.

FIGS. 7A-D are block diagrams illustrating full replay protocol for non-delay shards, according to an embodiment. For example, in FIG. 7A, messages M1, M3 and M4 are enqueued in source shard 710 at times T0, T2 and T3 respectively and are part of transaction Tx1, where T0<T2<T3. Similarly, messages M2, M5 and M6 are enqueued at time T1, T4 and T6 respectively and part of transaction Tx2 where T1<T4<T6.

At time T4, messages M1 to M5 are not committed and hence not seen by dequeuers. When transaction Tx1 commits at time T5, special control metadata is inserted which signifies transaction Tx1 is committed for messages M1, M3 and M4. At this time, only messages M1, M3 and M4 could be dequeued. Messages M2 and M5 are still not visible to dequeue sessions at time T5.

When transaction Tx2 commits at T7, a special control metadata is inserted which signifies transaction Tx2 is committed for messages M2, M5 and M6. At this time, all messages from M1 to M6 could be dequeued.

When a cross master process forwards source shard 710 to the destination instance, all messages along with the special control metadata are forwarded as is. At first, messages M1 to M5 are sent in order of enqueue time. In shadow shard 720, all messages are allocated as not committed and thus are not visible for dequeue, as marked "UC" in FIG. 7B.

Figure 7A:
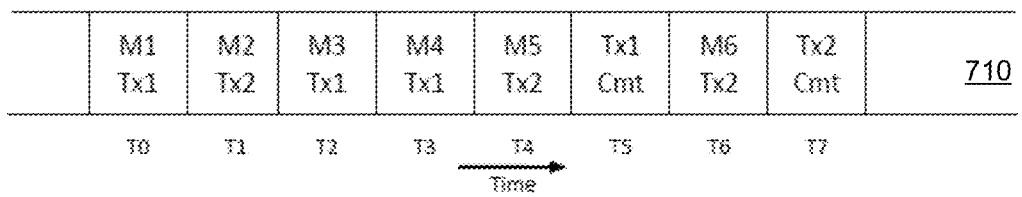
FIGS. 7A-D are block diagrams illustrating full replay protocol for non-delay shards.
Figure 7B:
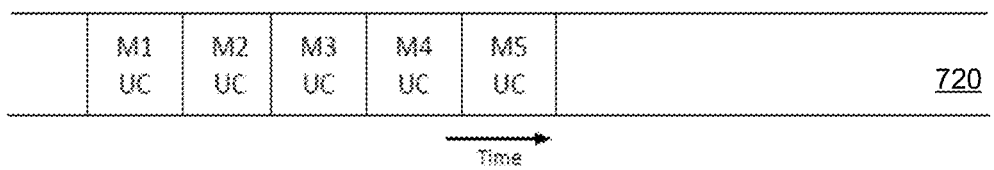
Figure 7C:
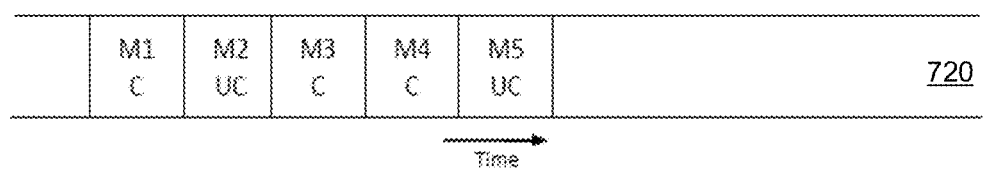

When the special control metadata for Tx1 commit is forwarded to the destination instance, the cross server process at the destination instance makes messages in transaction Tx1 visible for dequeue, as marked by "C" in FIG. 7C.

Figure 7D:
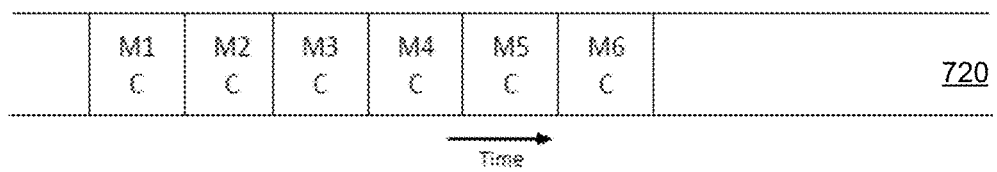

In one embodiment, special control metadata is not allocated in shadow shards. Finally, when the special control metadata for Tx2 commit is forwarded to the destination instance, the cross server process at destination instance makes messages in transaction Tx2 visible for dequeue as represented in FIG. 7D. As shown in FIGS. 7A-9D, full replay protocol preserves the ordering of messages enqueued by enqueue sessions in shadow shard 720.

Dequeue Commit

When a transaction that has dequeued messages for a subscriber commits, a post-commit callback operation is performed to update the state of the dequeued messages in the message cache. Specifically, in one embodiment, the following operations are performed on dequeue commit:

For the bit position of the subscriber for the message, set the subscriber bitmap bit to 0 and the lock bitmap bit to 1.

Attempt to move the commit low water mark forward from its current position. According to one or more embodiments, a commit low water mark can be moved over a message if the subscriber bit is 0 and lock bit is set to 1.

If the transaction commit completed the dequeue of a subshard, store the subshard number within the LWM table on disk. This indicates that all messages below the updated subshard number are not of interest to the subscriber for the shard.

Dequeue Rollback

In the case that a dequeue session cannot commit, the dequeue session may be rolled back. According to one embodiment, the following operations are performed on a dequeue rollback:

For the bit position of the subscriber for the message, set the lock bitmap bit to 0 indicating initial state of the message.

Reset the subscriber's dequeue pointer to this message only if the subscriber's dequeue pointer is ahead of the message.

Recycling/Reuse of Queue Partitions

As mentioned above, when a new queue table partition is needed to store incoming messages, the partition is obtained from a free pool if the free pool is not empty. Queue table partitions are added to the free pool when the messages they contain have been fully dequeued.

Specifically, according to one embodiment, partitions of the queue table are cycled from state "unmapped/free" to "mapped/in-use" to "unmapped/free" like reusable resource units from a pool. Once all the subscribers have dequeued a subshard, the partition mapped to the subshard is truncated and made available for reuse by a future subshard at the same instance.

Truncating Queue Table Partitions

When a dequeue commit happens, and the transaction was such that its dequeue position advanced across a subshard boundary to the next subshard, then the commit time callback stores an indication that the corresponding subscriber has completed the dequeue of the subshard. If the dequeuer was the final subscriber that needed to dequeue from the subshard which it switched from during the transaction, then that subshard could be freeable and truncatable.

On receiving the indication, a background process recalculates, such as from existing subscriber commit LWMs, the global LWM for the shard. If there is something which is found freeable below the global LWM (which indicates the subshard below which everything is dequeued), then a background process frees the subshards and truncates the partitions mapped to those subshard.

According to one embodiment, a SELECT query is used to identify all the partitions in the queue table map which are mapped and are below the Global Minimum LWM. These partitions are organized into one or more disjoint batches. Partition truncation is done one batch at a time by providing a list of partitions in a batch to ALTER TABLE TRUNCATE. After each batch of partitions is truncated, an UPDATE statement is used to unmap the partitions in the batch by clearing the shard, priority, subshard and map_time columns of the records corresponding to those partitions.

Optimizations

Using the dequeue rates for the dequeuer-shard pairs, estimated access time data is generated. The estimated access time data includes estimated data regarding future accesses of the sharded queue. For example, the estimated access time data may include the earliest estimated access time of a particular subshard by any dequeuer that is scheduled to access the particular subshard.

The estimated access time data for the plurality of subshards is used for message cache management. For example, the estimated access time data may be used to determine which subshards of the sharded queue to store in the message cache. Subshards that are stored in the message cache are referred to herein as "cached subshards." In some embodiments, the estimated access time data is used to determine that a cached subshard should be evicted from the message cache and/or that an evicted subshard should be stored in the message cache.

This approach improves performance by eliminating some unnecessary eviction operations on cached subshards in the message cache and/or restore operations from secondary storage, such as by reducing disk I/O for queues that are backed by secondary storage. In a relational database, this approach further improves performance by reducing SQL execution overhead for retrieving data stored in secondary storage. Furthermore, this approach more efficiently uses memory in the message cache. In addition, this approach reduces the occurrence of situations where a subshard is not stored in the message cache at a time that a dequeuer attempts to dequeue a message from the subshard, thereby avoiding the overhead and latency of accessing the message in secondary storage. In some embodiments, this approach approximates the optimal page replacement (OPT) for virtual memory swapping based on projections of the future enqueue rate and/or the future dequeue rates of each dequeuer on each shard.

Database Management Systems

Embodiments are used in the context of database management systems. Therefore, a description of a DBMS is useful. A DBMS manages a database. A DBMS may comprise one or more database servers, as described in further detail herein. A database comprises database data and a database dictionary that are stored on a persistent memory mechanism, such as a set of hard disks. Database data may be stored in one or more data containers. Each container contains records. The data within each record is organized into one or more fields. In relational DBMSs referred to herein, the data containers are referred to as relations or tables, the records are referred to as rows, and the fields are referred to as columns. According to further embodiments in object-oriented databases, the data containers are referred to as object classes, the records are referred to as objects, and the fields are referred to as attributes. Other database architectures may use other terminology.

Users may interact with an instance of a database server of a DBMS by submitting, to the database server instance, commands that cause the database server instance to perform operations on data stored in a database. For example, a user at a client device submits, via a database client, a database command requiring a distributed join (such as Query 1) to database server instance 114 with which the database client maintains a connection. A user may be one or more applications running on a client device that cause the database client to interact with database server instance 114. Multiple parties may access database resources through a given application. Multiple parties and/or users may also be referred to herein, collectively, as a user.

Architecture for Implementing Delayed Messages within a Sharded Message Queue

FIG. 1 is a block diagram that depicts an example arrangement of a DBMS 100. According to one or more embodiments, nodes 110, 130, and 150 are at least part of a cluster of nodes that implement a multi-node DBMS 100. According to one or more embodiments, any number of nodes may be part of a node cluster managed by a multi-node DBMS such as DBMS 100. Specifically, resources from multiple nodes in a multi-node database system can be allocated to run a particular database server's software. Furthermore, according to one or more embodiments not depicted in FIG. 1, DBMS 100 is a single-instance database management system, e.g., with only node 110.

Server devices 112, 132, and 152 are implemented by any type of computing device that is capable of running a database server instance to manage data in storage for the server devices and capable of communicating with other nodes in the cluster. In FIG. 1, server device 112 is configured with a database server instance 114, server device 132 is configured with a database server instance 134, and server device 152 is configured with a database server instance 154.

A database server instance (or "instance") is a server that comprises a combination of the software and allocation of resources from a node. Specifically, a server, such as a database server, is a combination of integrated software components and an allocation of computational resources, such as memory, a node (i.e., a computing device and/or memory accessible to the computing device), and/or processes on the node for executing the integrated software components on a processor, the combination of the software and computational resources being dedicated to performing a particular function on behalf of one or more clients.

Database server instances 114, 134, and 154 jointly maintain access to and manage database data 118, 138, and 158 stored in storages 116, 136, and 156 comprising one or more sets of disk drives. According to one or more embodiments, access to a given database comprises access to (a) a set of disk drives storing data for the database, and (b) data blocks stored thereon.

One or more of the functions attributed to processes running on nodes 110, 130, and 150, as described herein, may be performed any other logical entity that is part of DBMS 100, according to one or more embodiments. Server devices 112, 132, and 152 may be configured with other mechanisms, processes and functionalities, depending upon a particular implementation. Also, example DBMS 100 may comprise other devices, including client devices, server devices, storage devices, networks, and display devices, according to one or more embodiments.

In an embodiment, each of the processes and/or functionality described in connection with each of nodes 110, 130, and 150 is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

A shared-disk database, such as is implemented by DBMS 100, includes multiple instances configured to access a single database. One example of a shared-disk database is the Oracle Real Application Clusters (RAC). Oracle RAC includes multiple servers or hosts connected to each other by a high bandwidth, low latency interconnect. The interconnect is a private network that connects all of the instances of the shared-disk database. The system appears as a single database server to end users and applications. Various techniques provided herein may apply to multiple instance database configurations. Furthermore, the techniques provided herein, as applied to multiple instance database configurations, are not limited to Oracle RAC, and may apply to any proprietary and/or standardized shared-disk database architecture.

Shards 120, 140, and 160 store distinct sets of messages for the same sharded message queue 180. A message is data to be communicated via a message queue. In one embodiment, a message includes a set of metadata (including one or more properties of the message) and a payload. Each message is uniquely identified by a corresponding message identifier. The payload of a message is the data in the message. In one embodiment, each payload has associated metadata that is stored outside the payload in a message handle.

In the embodiment illustrated in FIG. 1, shard 120 stores messages, of sharded message queue 180, that are enqueued by enqueue sessions that are executing in instance 114. Similarly, shard 140 stores messages, of sharded message queue 180, that are enqueued by enqueue sessions that are executing in instance 134, and shard 160 stores messages, of sharded message queue 180, that are enqueued by enqueue sessions that are executing in instance 154. In one embodiment, an enqueue session that enqueues to a sharded queue always enqueues to the same shard of the sharded queue, referred to herein as "enqueue affinity."

In the example illustrated in FIG. 1, shards 120, 140, and 160 are maintained by distinct instances. Alternatively, according to one or more embodiments, one or more shards of a sharded queue may be maintained by the same instance. In one embodiment, a sharded queue as described herein is in a single instance database, and all shards of the sharded queue are maintained by the single instance. Multiple shards on a single instance may help minimize contention, such as among parallel enqueue sessions.

A sharded queue, such as sharded message queue 180, may be implemented on disk and/or in memory. An on-disk implementation may be stored in a database or in any other persistent storage. An in-memory implementation may be stored in RAM or any other volatile memory. In a shared-disk database, an in-memory implementation may be stored in shared memory accessible to all processes belonging to a single instance, such as the System Global Area (SGA) of a database instance. According to one or more embodiments, a sharded queue may be implemented on disk using a queue table, and/or in memory using a message cache.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
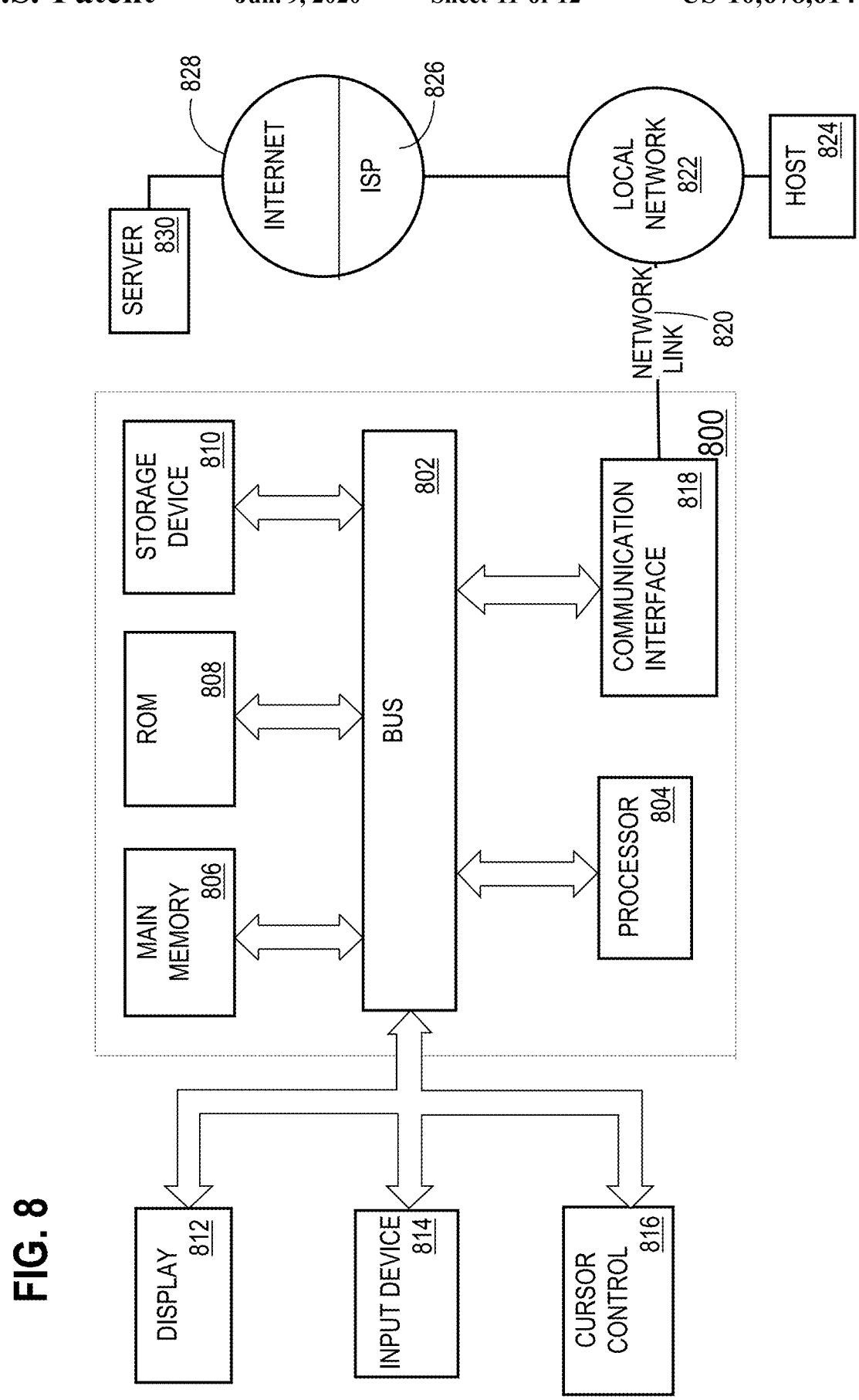
FIG. 8 is a block diagram of a computer system on which embodiments may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Software Overview

Figure 9:
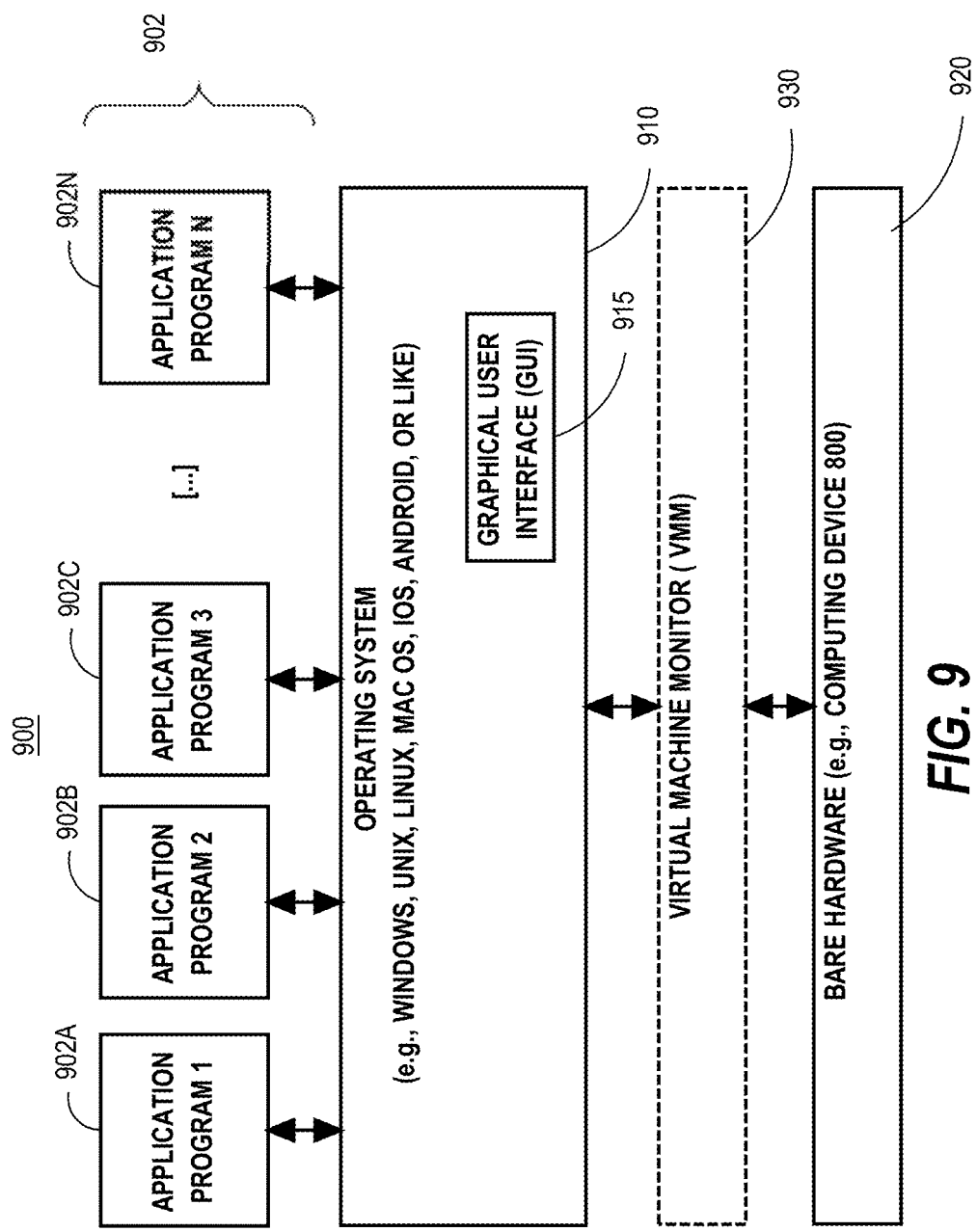
FIG. 9 is a block diagram of a basic software system that may be employed for controlling the operation of a computer system.

FIG. 9 is a block diagram of a basic software system 900 that may be employed for controlling the operation of computer system 800. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computer system 800. Software system 900, which may be stored in system memory (RAM) 806 and on fixed storage (e.g., hard disk or flash memory) 810, includes a kernel or operating system (OS) 910.

The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 810 into memory 806) for execution by the system 900. The applications or other software intended for use on computer system 800 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 804) of computer system 800. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the computer system 800.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of computer system 800 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/ private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DBaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
    storing a plurality of messages within a sharded message queue maintained by a database management system;
    wherein the sharded message queue comprises a plurality of message queue shards that includes a particular pair of message queue shards;
    wherein the particular pair of message queue shards comprises (a) a non-delay message queue shard, and (b) a delay message queue shard;
    wherein the plurality of messages comprises one or more delayed messages and one or more non-delayed messages;
    wherein storing the plurality of messages comprises:
        storing the one or more delayed messages in the delay message queue shard of the particular pair, and
        storing the one or more non-delayed messages in the non-delay message queue shard of the particular pair;
    making a particular message, from the particular pair of message queue shards, available for dequeuing comprising:
        identifying a pair of messages comprising a particular delayed message and a particular non-delayed message,
        wherein the particular delayed message, from the delay message queue shard, has an earliest delivery time among messages of the delay message queue shard, and
        wherein the particular non-delayed message, from the non-delay message queue shard, has an earliest delivery time among messages of the non-delay message queue shard, and
        wherein the particular message is a message, of the pair of messages, that has an earliest delivery time of the pair of messages;
    wherein the method is performed by one or more computing devices.

2. The method of claim 1, wherein:
    the delay message queue shard comprises a plurality of child bucket shards;
    each child bucket shard of the plurality of child bucket shards stores a respective set of stored messages that have delivery times within a respective range of delivery times; and
    within each child bucket shard, of the plurality of child bucket shards, the respective set of stored messages is ordered by message enqueue time.

3. The method of claim 2, further comprising identifying the particular delayed message within a current cached child bucket shard, of the plurality of child bucket shards of the delay message queue shard, by performing one of:
    a search within an in-memory index, generated based on the current cached child bucket shard, to identify the particular delayed message having an earliest delivery time; or
    a full scan of all subshards of the current cached child bucket shard to identify the particular delayed message having an earliest delivery time.

4. The method of claim 2, further comprising:
    identifying the particular delayed message within a current uncached child bucket shard, of the plurality of child bucket shards of the delay message queue shard, by running a database query to identify the particular delayed message having an earliest delivery time;
    wherein running the database query is based, at least in part, on an index that indexes delivery times of the messages within the current uncached child bucket shard.

5. The method of claim 2, wherein:
    each child bucket shard, of the plurality of child bucket shards of the delay message queue shard, comprises a respective plurality of subshards stored within a corresponding disk partition associated with said each child bucket shard;
    the method further comprises performing bulk deletion on a particular child bucket shard, of the plurality of child bucket shards, by:
        detecting that all messages have been fully dequeued from all subshards, of the particular child bucket shard, that are stored in a particular disk partition associated with the particular child bucket shard; and
        in response to detecting that all messages have been fully dequeued from all subshards of the particular child bucket shard, truncating the particular disk partition.

6. The method of claim 1, wherein the one or more non-delayed messages stored in the non-delay message queue shard are ordered by message enqueue time.

7. The method of claim 1, wherein:
the particular pair of message queue shards comprises a plurality of implementation message queue shards;
wherein each of the plurality of implementation message queue shards includes a respective ordered set of messages that is ordered according to enqueue time;
the method further comprises:
determining that a transaction that caused one or more messages to be published to one or more implementation message queue shards, of the plurality of implementation message queue shards, has committed; and
in response to determining that the transaction has committed, including, at an end of each ordered set of messages in the one or more implementation message queue shards, transaction control metadata that at least identifies the transaction.

8. The method of claim 1, further comprising:
a first database server instance, of the database management system, maintaining the particular pair of message queue shards;
determining that a particular dequeuer dequeues from a subset of message queue shards maintained by the database management system, wherein the subset of message queue shards excludes message queue shards maintained by the first database server instance;
in response to determining that particular dequeuer dequeues from the subset of message queue shards maintained by the database management system, forwarding messages from the particular pair of message queue shards to a corresponding pair of shadow message queue shards maintained by a second database server instance of the database management system.

9. The method of claim 8, wherein:
the particular pair of message queue shards comprises a plurality of implementation message queue shards;
each of the plurality of implementation message queue shards includes a respective ordered set of messages that is ordered according to enqueue time; and
forwarding messages from the particular pair of message queue shards to the corresponding pair of shadow message queue shards comprises:
sending, from the first database server instance to the second database server instance, a first set of messages that reside in the plurality of implementation message queue shards before one of:
an end of the ordered set of messages in an implementation message queue shard, or
transaction control metadata within an implementation message queue shard;
after sending the first set of messages, identifying two or more transaction control metadata residing, within the plurality of implementation message queue shards, after messages in the first set of messages;
wherein the two or more transaction control metadata identify two or more different transactions;
determining that a particular transaction, of the two or more different transactions, has a lowest identifier value among the two or more different transactions;
in response to determining that the particular transaction has the lowest identifier value among the two or more different transactions, sending, from the first database server instance to the second database server instance, particular transaction control metadata, from the two or more transaction control metadata, that identifies the particular transaction.

10. The method of claim 9, further comprising the second database server instance:
in response to receiving the first set of messages from the first database server instance, populating the corresponding pair of shadow message queue shards with the first set of messages;
in response to receiving the particular transaction control metadata, making messages, within the corresponding pair of shadow message queue shards that correspond to the particular transaction, available for dequeuing.

11. The method of claim 1, further comprising:
maintaining a second plurality of messages on persistent storage;
loading the second plurality of messages from the persistent storage into a second pair of message queue shards, maintained in memory, that includes a second delay message queue shard and a second non-delay message queue shard;
wherein the second plurality of messages includes both delayed and non-delayed messages;
identifying a set of messages, including both delayed and non-delayed messages from among the second plurality of messages, that have delivery times during a particular time span;
inserting control metadata, into each message queue shard in the second pair of message queue shards that stores messages from the set of messages, wherein the control metadata indicates a particular transaction control identifier for the messages from the set of messages.

12. One or more non-transitory computer-readable media storing one or more sequences of instructions that, when executed by one or more processors, cause:
storing a plurality of messages within a sharded message queue maintained by a database management system;
wherein the sharded message queue comprises a plurality of message queue shards that includes a particular pair of message queue shards;
wherein the particular pair of message queue shards comprises (a) a non-delay message queue shard, and (b) a delay message queue shard;
wherein the plurality of messages comprises one or more delayed messages and one or more non-delayed messages;
wherein storing the plurality of messages comprises:
storing the one or more delayed messages in the delay message queue shard of the particular pair, and
storing the one or more non-delayed messages in the non-delay message queue shard of the particular pair;
making a particular message, from the particular pair of message queue shards, available for dequeuing comprising:
identifying a pair of messages comprising a particular delayed message and a particular non-delayed message,
wherein the particular delayed message, from the delay message queue shard, has an earliest delivery time among messages of the delay message queue shard, and
wherein the particular non-delayed message, from the non-delay message queue shard, has an earliest delivery time among messages of the non-delay message queue shard, and wherein the particular message is a message, of the pair of messages, that has an earliest delivery time of the pair of messages.

13. The one or more non-transitory computer-readable media of claim 12, wherein:
the delay message queue shard comprises a plurality of child bucket shards;
each child bucket shard of the plurality of child bucket shards stores a respective set of stored messages that have delivery times within a respective range of delivery times; and
within each child bucket shard, of the plurality of child bucket shards, the respective set of stored messages is ordered by message enqueue time.

14. The one or more non-transitory computer-readable media of claim 13, wherein the one or more sequences of instructions further comprise instructions that, when executed by one or more processors, cause identifying the particular delayed message within a current cached child bucket shard, of the plurality of child bucket shards of the delay message queue shard, by performing one of:
a search within an in-memory index, generated based on the current cached child bucket shard, to identify the particular delayed message having an earliest delivery time; or
a full scan of all subshards of the current cached child bucket shard to identify the particular delayed message having an earliest delivery time.

15. The one or more non-transitory computer-readable media of claim 13, wherein the one or more sequences of instructions further comprise instructions that, when executed by one or more processors, cause:
identifying the particular delayed message within a current uncached child bucket shard, of the plurality of child bucket shards of the delay message queue shard, by running a database query to identify the particular delayed message having an earliest delivery time;
wherein running the database query is based, at least in part, on an index that indexes delivery times of the messages within the current uncached child bucket shard.

16. The one or more non-transitory computer-readable media of claim 13, wherein:
each child bucket shard, of the plurality of child bucket shards of the delay message queue shard, comprises a respective plurality of subshards stored within a corresponding disk partition associated with said each child bucket shard;
the one or more sequences of instructions further comprise instructions that, when executed by one or more processors, cause performing bulk deletion on a particular child bucket shard, of the plurality of child bucket shards, by:
detecting that all messages have been fully dequeued from all subshards, of the particular child bucket shard, that are stored in a particular disk partition associated with the particular child bucket shard; and
in response to detecting that all messages have been fully dequeued from all subshards of the particular child bucket shard, truncating the particular disk partition.

17. The one or more non-transitory computer-readable media of claim 12, wherein:
the particular pair of message queue shards comprises a plurality of implementation message queue shards;

wherein each of the plurality of implementation message queue shards includes a respective ordered set of messages that is ordered according to enqueue time;
the one or more sequences of instructions further comprise instructions that, when executed by one or more processors, cause:
determining that a transaction that caused one or more messages to be published to one or more implementation message queue shards, of the plurality of implementation message queue shards, has committed; and
in response to determining that the transaction has committed, including, at an end of each ordered set of messages in the one or more implementation message queue shards, transaction control metadata that at least identifies the transaction.

18. The one or more non-transitory computer-readable media of claim 12, wherein the one or more sequences of instructions further comprise instructions that, when executed by one or more processors, cause:
a first database server instance, of the database management system, maintaining the particular pair of message queue shards;
determining that a particular dequeuer dequeues from a subset of message queue shards maintained by the database management system, wherein the subset of message queue shards excludes message queue shards maintained by the first database server instance;
in response to determining that particular dequeuer dequeues from the subset of message queue shards maintained by the database management system, forwarding messages from the particular pair of message queue shards to a corresponding pair of shadow message queue shards maintained by a second database server instance of the database management system.

19. The one or more non-transitory computer-readable media of claim 18, wherein:
the particular pair of message queue shards comprises a plurality of implementation message queue shards;
each of the plurality of implementation message queue shards includes a respective ordered set of messages that is ordered according to enqueue time; and
forwarding messages from the particular pair of message queue shards to the corresponding pair of shadow message queue shards comprises:
sending, from the first database server instance to the second database server instance, a first set of messages that reside in the plurality of implementation message queue shards before one of:
an end of the ordered set of messages in an implementation message queue shard, or
transaction control metadata within an implementation message queue shard;
after sending the first set of messages, identifying two or more transaction control metadata residing, within the plurality of implementation message queue shards, after messages in the first set of messages;
wherein the two or more transaction control metadata identify two or more different transactions;
determining that a particular transaction, of the two or more different transactions, has a lowest identifier value among the two or more different transactions;
in response to determining that the particular transaction has the lowest identifier value among the two or more different transactions, sending, from the first database server instance to the second database server instance, particular transaction control metadata, from the two or more transaction control metadata, that identifies the particular transaction; and
wherein the one or more sequences of instructions further comprise instructions that, when executed by one or more processors, cause the second database server instance to perform:
in response to receiving the first set of messages from the first database server instance, populating the corresponding pair of shadow message queue shards with the first set of messages;
in response to receiving the particular transaction control metadata, making messages, within the corresponding pair of shadow message queue shards that correspond to the particular transaction, available for dequeuing.

20. The one or more non-transitory computer-readable media of claim 12, wherein the one or more sequences of instructions further comprise instructions that, when executed by one or more processors, cause:
maintaining a second plurality of messages on persistent storage;
loading the second plurality of messages from the persistent storage into a second pair of message queue shards, maintained in memory, that includes a second delay message queue shard and a second non-delay message queue shard;
wherein the second plurality of messages includes both delayed and non-delayed messages;
identifying a set of messages, including both delayed and non-delayed messages from among the second plurality of messages, that have delivery times during a particular time span;
inserting control metadata, into each message queue shard in the second pair of message queue shards that stores messages from the set of messages, wherein the control metadata indicates a particular transaction control identifier for the messages from the set of messages.

21. A system comprising:
one or more processors;
wherein the one or more processors are communicatively coupled to storage including one or more non-transitory computer-readable media;
wherein the one or more non-transitory computer-readable media store instructions that, when executed by the one or more processors, cause:
storing, on the storage, a plurality of messages within a sharded message queue maintained by a database management system;
wherein the sharded message queue comprises a plurality of message queue shards that includes a particular pair of message queue shards;
wherein the particular pair of message queue shards comprises (a) a non-delay message queue shard, and (b) a delay message queue shard;
wherein the plurality of messages comprises one or more delayed messages and one or more non-delayed messages;
wherein storing the plurality of messages comprises:
storing, on the storage, the one or more delayed messages in the delay message queue shard of the particular pair, and
storing, on the storage, the one or more non-delayed messages in the non-delay message queue shard of the particular pair;
making a particular message, from the particular pair of message queue shards, available for dequeuing comprising:
identifying a pair of messages comprising a particular delayed message and a particular non-delayed message,
wherein the particular delayed message, from the delay message queue shard, has an earliest delivery time among messages of the delay message queue shard, and
wherein the particular non-delayed message, from the non-delay message queue shard, has an earliest delivery time among messages of the non-delay message queue shard, and
wherein the particular message is a message, of the pair of messages, that has an earliest delivery time of the pair of messages.

* * * * *